(12) United States Patent
Xie et al.

(10) Patent No.: US 9,417,711 B2
(45) Date of Patent: *Aug. 16, 2016

(54) SYSTEM AND METHOD FOR IMPLEMENTING SLIDING INPUT OF TEXT BASED UPON ON-SCREEN SOFT KEYBOARD ON ELECTRONIC EQUIPMENT

(71) Applicant: SHANGHAI CHULE (COOTEK) INFORMATION TECHNOLOGY CO., LTD., Shanghai (CN)

(72) Inventors: Haichao Xie, Shanghai (CN); Qing Zhang, Shanghai (CN); Qi He, Shanghai (CN)

(73) Assignee: SHANGHAI CHULE (COOTEK) INFORMATION TECHNOLOGY CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,270

(22) Filed: Sep. 17, 2015

(65) Prior Publication Data

US 2016/0004328 A1 Jan. 7, 2016

Related U.S. Application Data

(63) Continuation of application No. 14/110,817, filed as application No. PCT/CN2011/072559 on Apr. 9, 2011, now Pat. No. 9,182,831.

(51) Int. Cl.
*G06F 3/023* (2006.01)
*G06F 3/0488* (2013.01)

(52) U.S. Cl.
CPC .......... *G06F 3/0237* (2013.01); *G06F 3/04883* (2013.01); *G06F 2203/04808* (2013.01)

(58) Field of Classification Search
CPC ............ G06F 3/04886; G06F 3/04883; G06F 3/0237; G06F 3/017
USPC ........................... 345/173; 715/773, 863, 864
See application file for complete search history.

(56) References Cited

U.S. PATENT DOCUMENTS

| | | |
|---|---|---|
| 5,479,536 A | 12/1995 | Comerford |
| 5,487,616 A | 1/1996 | Ichbiah |
| 5,724,449 A | 3/1998 | Cornerford |

(Continued)

FOREIGN PATENT DOCUMENTS

| | | |
|---|---|---|
| CN | 1295703 A | 5/2001 |
| CN | 1761989 A | 4/2006 |

(Continued)

*Primary Examiner* — Koosha Sharifi-Tafreshi
(74) *Attorney, Agent, or Firm* — Novick, Kim & Lee, PLLC

(57) ABSTRACT

A system for implementing the sliding input of a text based upon an on-screen soft keyboard on an electronic equipment is provided. The system comprises a feature lexicon module, a feature lexicon establishment module, a user interface module, a sliding trajectory feature extraction module, a rough classifying and filtering module, a rough matching and filtering module and an accurate matching and sorting module. A method for implementing the sliding input using the system is also provided. The system and the method can input a word according to the preorder trajectory of the input portion, and cleverly use a forecasting-between-slidings input, decrease a sliding distance, effectively improve the input speed and accuracy of words, and simplify the operation for the users.

23 Claims, 15 Drawing Sheets

(56) References Cited

U.S. PATENT DOCUMENTS

| | | |
|---|---|---|
| 5,963,671 A | 10/1999 | Comerford et al. |
| 6,031,525 A | 2/2000 | Perlin |
| 6,037,930 A | 3/2000 | Wolfe et al. |
| 6,272,575 B1 | 8/2001 | Rajchel |
| 7,098,896 B2 | 8/2006 | Kushler et al. |
| 7,251,367 B2 | 7/2007 | Zhai et al. |
| 7,453,439 B1 | 11/2008 | Kushler et al. |
| 7,533,245 B2 * | 5/2009 | Frieder ............ G06F 17/30619 707/999.1 |
| 2002/0140680 A1 | 10/2002 | Lu et al. |
| 2003/0076302 A1 | 4/2003 | Langstraat |
| 2004/0140956 A1 * | 7/2004 | Kushler ............ G06F 3/04883 345/168 |
| 2005/0190973 A1 | 9/2005 | Kristensson et al. |
| 2006/0119582 A1 | 6/2006 | Ng et al. |
| 2007/0040813 A1 | 2/2007 | Kushler et al. |
| 2008/0316212 A1 | 12/2008 | Kushler et al. |

FOREIGN PATENT DOCUMENTS

| | | |
|---|---|---|
| CN | 101529494 A | 9/2009 |
| CN | 101676851 A | 3/2010 |
| CN | 101943996 A | 1/2011 |
| EP | 0544123 A2 | 6/1993 |
| JP | 2000155642 A | 6/2000 |
| JP | 2001242998 A | 9/2001 |
| JP | 2001282427 A | 10/2001 |
| KR | 10-2006-0017743 A | 2/2006 |
| WO | 99/50818 A1 | 10/1999 |
| WO | 2004/066075 A2 | 8/2004 |
| WO | 2007/035827 A2 | 3/2007 |
| WO | 2008/013658 A2 | 1/2008 |

* cited by examiner

SYSTEM AND METHOD FOR IMPLEMENTING SLIDING INPUT OF TEXT BASED UPON ON-SCREEN SOFT KEYBOARD ON ELECTRONIC EQUIPMENT

CROSS REFERENCE TO RELATED APPLICATIONS

This instant application is a continuation application of, and claims priority to, U.S. patent application Ser. No. 14/110,817, filed Oct. 9, 2013, which is a 371 national stage application of PCT/CN2011/072559, filed Apr. 9, 2011.

FIELD OF THE INVENTION

This invention relates to a field of input control of an electronic equipment, specifically to a field of electronic equipment touch screen information input technology, more specifically to a system and method for implementing the sliding input of a text based upon an on-screen soft keyboard on an electronic equipment.

DESCRIPTION OF THE RELATED ART

In modern life, with the continues development of integrated circuit technology, various electronic equipments equipped with touch screens have been developed. On those various electronic equipments equipped with touch screens (e.g. handheld computers, smart phones, embedded systems, pocket computers, and so on), due to constraint of factors such as volume and cost of manufacture, a perfect hardware keyboard is unable to be provided, thus, input on such equipments is usually realized by software simulation.

Usually, in prior art, conventional soft keyboards will bring great inconvenience to the users at the time of using them. This is mainly because that the area of the touch screen is small while there are too many contents to be selected, so that the corresponding screen selection region is also small. Accordingly, the user can't accurately tap the selection region on the screen directly by fingers so as to input; rather, some tools with higher contact resolution, such as handwriting pens, are always desired.

In most situations, the user is required to operate with both hands: one hand is to hold the electronic equipment, while the other hand is to take the handwriting pen to tap the touch screen so as to input. Even so, in some environments such as running cars, even by means of other tools, due to influence of the environment, for example vibrations, the user still probably can't accurately select the content to be input.

As shown in FIG. 1, usually, on an equipment 100 equipped with a small touch screen and the like, most inputs are realized by means of a soft keyboard 102. The user finishes an input by tapping a key, such as key 104, on the keyboard. However, ordinary touch screen software finishes the selection of input content at the time of the user pressing and tapping the key on the soft keyboard. In order to realize the object of accurate inputting, the user always need the aid of auxiliary tools with high tapping resolution, such as handwriting pens, to perform input. Even so, in some situations, for example, the user is sitting in a running and bumpy car, it is still possible for the user to incorrectly tapping the content on the keyboard due to various reasons so as to cause misoperation.

Another way to input text on the touch screen is sliding input. The user sequentially slides across the positions of individual letters of a word on a soft keyboard, and then input a desired word.

Such method has an advantage that the finger of the user does not need to leave the touch screen, so that the speed of sliding can be faster than that of tapping, thus text input can be made faster and more convenient. However, such method still has some main disadvantages:

1. the sliding trajectory will be highly inaccurate, thus it is hard to realize a high accuracy of prediction;
2. the method requires a computation with high complexity, thus it is hard to be realized on an electronic equipment with limited computational capability;
3. a complete trajectory of a word needs to be slided out so as to finish the computation, thus, as for some long words, it is difficult for the user to line out a complete and correct trajectory.

Therefore, in actual applications, a more accurate, faster and easier sliding input system and method are still desired.

SUMMARY OF THE INVENTION

An object of the invention is to overcome above defects in prior art, and to provide a system for implementing the sliding input of a text based upon an on-screen soft keyboard on an electronic equipment which can effectively improve speed and accuracy of the input of words and obviously reduce operation complexity of users, and which has a simple implementation process, convenient and fast utilization, low computational complexity and an wide applicable scope.

Another object of the invention is to provide a method for implementing the sliding input of a text based upon an on-screen soft keyboard on an electronic equipment based on such system.

In order to realize the above objects, the system and method for implementing the sliding input of a text based upon an on-screen soft keyboard on an electronic equipment of the invention are as follows:

The system for implementing the sliding input of a text based upon an on-screen soft keyboard on an electronic equipment is characterized in that said system comprises:

a feature lexicon module, for storing ideal sliding trajectory features for words;

a feature lexicon establishment module, for extracting corresponding ideal sliding trajectory features with respect to word from a dictionary and storing them in said feature lexicon module;

a user interface module, for processing interactions with a user, recording user-sliding trajectories, and displaying a result of candidate words;

a sliding trajectory feature extraction module, for receiving the user-sliding trajectories recorded by said user interface module, and converting them into a user-sliding trajectory feature set to be processed;

a rough classifying and filtering module, for receiving the user-sliding trajectory feature set output from said sliding trajectory feature extraction module, obtaining words having similar ideal sliding trajectory feature with the user-sliding trajectory feature set by classifying and filtering in said feature lexicon module, and composing an original chosen word set;

a rough matching and filtering module, for receiving the original chosen word set output from said rough classifying and filtering module, using a key point feature to calculate a similarity between the ideal sliding trajectory feature of each word in the original chosen word set and said user-sliding trajectory feature set, and obtaining a follow-up chosen word set by sorting according to the similarity as well as matching and filtering.

The system for implementing the sliding input of a text based upon an on-screen soft keyboard on an electronic equipment further comprises:

an accurate matching and sorting module, for receiving the follow-up chosen word set delivered from said rough matching and filtering module, accurately calculating an accurate similarity between the ideal sliding trajectory feature of each word in the follow-up chosen word set and said user-sliding trajectory feature set, obtaining the candidate result of words by sorting according to the accurate similarity, word frequency, user input history information, and feedbacking the candidate result of words to said user interface module.

The method for implementing the sliding input of a text based upon an on-screen soft keyboard on an electronic equipment based on above system is characterized in that said method comprises the following steps:

(1) a feature lexicon establishment processing operation, for extracting ideal sliding trajectory features corresponding to word in a dictionary and storing them in said feature lexicon module;

(2) a user interface interaction information processing operation, for processing interactions with a user, and recording user-sliding trajectories;

(3) a sliding trajectory feature extraction processing operation, for converting the user-sliding trajectories recorded by said user interface module into a user-sliding trajectory feature set to be processed;

(4) a rough classifying and filtering processing operation, for obtaining words having similar ideal sliding trajectory feature with the user-sliding trajectory feature set by classifying and filtering in said feature lexicon module, and composing a original chosen word set;

(5) a rough matching and filtering processing operation, for using a key point feature to calculate a similarity between the ideal sliding trajectory feature of each word in the original chosen word set and said user-sliding trajectory feature set, obtaining a follow-up chosen word set by sorting according to the similarity as well as matching and filtering, and feedbacking the follow-up chosen word set as the candidate result of words to said user interface module.

The step (5) of the method for implementing the sliding input of a text based upon an on-screen soft keyboard on an electronic equipment also includes the following processing steps on the follow-up chosen word set:

(6) an accurate matching and sorting operation, for accurately calculating an accurate similarity between the ideal sliding trajectory feature of each word in the follow-up chosen word set and said user-sliding trajectory feature set, obtaining the candidate result of words by sorting according to the accurate similarity, word frequency and user input history information, and feedbacking the candidate result of words to said user interface module.

The ideal sliding trajectory features of said word in the method for implementing the sliding input of a text based upon an on-screen soft keyboard on an electronic equipment include ideal trajectory lengths of ideal trajectories of words and an ideal word key point sequence, and said ideal word key point sequence is an ordered combination of key points on the ideal trajectory of the word.

The key points in the method for implementing the sliding input of a text based upon an on-screen soft keyboard on an electronic equipment include starting and ending key points as well as ordinary key points of the trajectory, and said ordinary key points are inflection points on the trajectory.

The feature lexicon module in the method for implementing the sliding input of a text based upon an on-screen soft keyboard on an electronic equipment keeps K-Grams inverted index.

In the method for implementing the sliding input of a text based upon an on-screen soft keyboard on an electronic equipment, K-Grams inverted index is a Bi-grams inverted index.

In the method for implementing the sliding input of a text based upon an on-screen soft keyboard on an electronic equipment, the K-Grams inverted index includes a mapping from a K-Grams key point to a word node, and said word node includes word identification and the probability that said K-Grams key point appears in the ideal sliding trajectory of said word.

In the method for implementing the sliding input of a text based upon an on-screen soft keyboard on an electronic equipment, the feature lexicon module keeps a word feature table and an ideal word trajectory index table, fields in said word feature table include a word identification, word contents, ideal trajectory length and word length; and said ideal word trajectory index table refers word identification in the word feature table.

In the method for implementing the sliding input of a text based upon an on-screen soft keyboard on an electronic equipment, the ideal trajectory of the word may be a large number of similar trajectories of corresponding words extracted from sliding trajectories of the user according to a large number of training data; or, the ideal trajectory of the word may be straight lines connecting centers of sequential letters of the word on the on-screen soft keyboard.

In the method for implementing the sliding input of a text based upon an on-screen soft keyboard on an electronic equipment, converting the user-sliding trajectories into a user-sliding trajectory feature set to be processed includes the following steps:

(21) performing a trajectory preprocessing operation on the user-sliding trajectory by the system;

(22) performing a key point extraction processing operation on the preprocessed user-sliding trajectory by the system.

In the method for implementing the sliding input of a text based upon an on-screen soft keyboard on an electronic equipment, said rough classifying and filtering processing operation applies an incremental calculation method.

In the method for implementing the sliding input of a text based upon an on-screen soft keyboard on an electronic equipment, said rough classifying and filtering processing operation includes the following steps:

(31) calculating a rough matching degree between words in said feature lexicon module and said user-sliding trajectory feature set;

(32) if the rough matching degree is greater than a rough matching degree threshold preseted by the system, adding corresponding word into said original chosen word set;

(33) returning to above step (31), until every word in the feature lexicon module has been traversed.

In the method for implementing the sliding input of a text based upon an on-screen soft keyboard on an electronic equipment, calculating a rough matching degree between words in said feature lexicon module and said user-sliding trajectory feature set includes the following steps:

(311) extracting a key point sequence on the user-sliding trajectory according to the user-sliding trajectory feature set;

(312) obtaining a corresponding K-Grams character string set according to the key point sequence on said user-sliding trajectory;

(313) inquiring in said feature lexicon module by making individual K-Grams character string in the K-Grams character string set as query conditions, and fetching out probabilities of all the inquired-out K-Grams character strings and words corresponding to individual probability;

(314) calculating a probability P(C|W) that the user effectively wants to obtain a word C on precondition that the user inputs a sliding trajectory W;

(315) calculating a rough matching degree between the sliding trajectory W and the word C.

In the method for implementing the sliding input of a text based upon an on-screen soft keyboard on an electronic equipment, said calculating the rough matching degree between words in the feature lexicon module and the user-sliding trajectory feature set uses a prefix matching method.

In the method for implementing the sliding input of a text based upon an on-screen soft keyboard on an electronic equipment, calculating a similarity between the ideal sliding trajectory feature of each word in the original chosen word set and said user-sliding trajectory feature set, and obtaining a follow-up chosen word set by sorting as well as matching and filtering, includes the following steps:

(41) calculating a linear matching distance between the ideal trajectory of each word in said original chosen word set and said user-sliding trajectory feature set;

(42) if the linear matching distance is smaller than the linear matching distance threshold preseted by the system, adding corresponding word into said follow-up chosen word set;

(43) returning to above step (41), until every word in the original chosen word set has been traversed.

In the method for implementing the sliding input of a text based upon an on-screen soft keyboard on an electronic equipment, the following steps are performed before step (41):

(40) performing trajectory segmentation on the ideal trajectories of words in the original chosen word set according to said user-sliding trajectory feature set.

In the method for implementing the sliding input of a text based upon an on-screen soft keyboard on an electronic equipment, obtaining the result of candidate words by sorting according to the accurate similarity, word frequency and user input history information includes the following steps:

(61) calculating accurate matching distances between each word in the follow-up chosen word set and the user-sliding trajectory feature set;

(62) sorting all the accurate matching distance by magnitude;

(63) choosing a word corresponding to the smallest accurate matching distance according to the number of candidate words preseted by the system, as the result of candidate words.

In the method for implementing the sliding input of a text based upon an on-screen soft keyboard on an electronic equipment, extracting the ideal sliding trajectory features corresponding to a word and storing them into the feature lexicon module include the following steps:

(11) extracting ideal trajectory length and word length of the word, mading a count on the word frequency of the word, and storing it into a corresponding record in said word feature table, wherein said word length is the number of characters included in the word;

(12) performing Bi-grams segmentation on the word so as to obtaining a Bi-grams character string subset;

(13) calculating probability $P(X_{k-1}X_k|C)$ of each Bi-grams character string in the Bi-grams character string subset according to the following formula:

$$P(X_{k-1}X_k|C)=P(X_{k-1}|C) \times P(X_k|C);$$

wherein, C is word; $X_{k-1}$ and $X_k$ both are key points on the ideal trajectory of the word; $P(X_k|C)$ is probability that key point $X_k$ appears in the word;

(14) establishing a corresponding Bi-grams inverted index according to probability $P(X_{k-1}X_k|C)$ of each Bi-grams character string in said Bi-grams character string subset and word identification of corresponding word W within the word feature table;

(15) configuring a global ideal word trajectory index table according to all the Bi-grams inverted index corresponding to said Bi-grams character string subset.

In the method for implementing the sliding input of a text based upon an on-screen soft keyboard on an electronic equipment, counting the word frequency of the word may be an independent statistics or a statistical analysis based on a corpus derived from internet.

In the method for implementing the sliding input of a text based upon an on-screen soft keyboard on an electronic equipment, the probability that key point appears in the word may be a word-based key-point-present probability calculated according to a number of actual trajectories corresponding to the word in a large number of training data, or may be a key-point-present probability preseted by the system.

In the method for implementing the sliding input of a text based upon an on-screen soft keyboard on an electronic equipment, the key-point-present probability preseted by the system is equal to 1, and the key points are exactly located on corresponding letters of the word.

In the method for implementing the sliding input of a text based upon an on-screen soft keyboard on an electronic equipment, converting the user-sliding trajectory into the user-sliding trajectory feature set to be processed includes the following steps:

(21) performing trajectory preprocessing operation on the user-sliding trajectory by the system;

(22) performing key point extraction processing operation on the preprocessed user-sliding trajectory by the system.

In the method for implementing the sliding input of a text based upon an on-screen soft keyboard on an electronic equipment, performing trajectory preprocessing operation on the user-sliding trajectory includes the following steps:

(211) performing size normalization process on the user-sliding trajectory so as to obtain a point sequence with unified coordinate system;

(212) performing trajectory smoothing process on said point sequence so as to obtain a point sequence without noise caused by dithering.

In the method for implementing the sliding input of a text based upon an on-screen soft keyboard on an electronic equipment, the trajectory smoothing process are specifically as follows:

performing smoothing process on the trajectory, so as to eliminate noise in the sliding trajectory data caused by reasons such as dithering of hands.

In the method for implementing the sliding input of a text based upon an on-screen soft keyboard on an electronic equipment, performing smoothing process on the trajectory is specifically as follows:

performing smoothing process on the trajectory by means of mean filter.

In the method for implementing the sliding input of a text based upon an on-screen soft keyboard on an electronic equipment, performing key point extraction processing operation on the user-sliding trajectory includes the following steps:

(221) choosing key points on the user-sliding trajectory;
(222) calculating length of the user-sliding trajectory.

In the method for implementing the sliding input of a text based upon an on-screen soft keyboard on an electronic equipment, choosing key points on the user-sliding trajectory includes the following steps:

(2211) fetching out starting and ending points of the user-sliding trajectory as starting and ending key points;
(2212) calculating change rate of slope of each point in the point sequence of the user-sliding trajectory, and fetching out inflection points in the trajectory as ordinary key points.

In the method for implementing the sliding input of a text based upon an on-screen soft keyboard on an electronic equipment, calculating change rate of slope of each point in the point sequence of the user-sliding trajectory is specifically as follows:

calculating change rate of slope of each point in the point sequence of the user-sliding trajectory by using second-order difference.

In the method for implementing the sliding input of a text based upon an on-screen soft keyboard on an electronic equipment, calculating length of the user-sliding trajectory includes the following steps:

(2221) calculating distances between every two successive points according to the point sequence of the user-sliding trajectory;
(2222) adding up all the distances between two successive points, so as to obtain the length of the user-sliding trajectory.

In the method for implementing the sliding input of a text based upon an on-screen soft keyboard on an electronic equipment, obtaining words having similar ideal sliding trajectory feature with the user-sliding trajectory feature set by classifying and filtering, and composing a original chosen word set, include the following steps:

(31) calculating the rough matching degree between words in said feature lexicon module and said user-sliding trajectory feature set;
(32) if the rough matching degree is greater than the rough matching degree threshold preseted by the system, adding corresponding word into said original chosen word set;
(33) returning to above step (31), until every word in the feature lexicon module has been traversed.

In the method for implementing the sliding input of a text based upon an on-screen soft keyboard on an electronic equipment, calculating the rough matching degree between words in said feature lexicon module and said user-sliding trajectory feature set may include the following steps:

(311) extracting length of the user-sliding trajectory and the key point sequence on the user-sliding trajectory according to the user-sliding trajectory feature set;
(312) obtaining corresponding Bi-grams character string set according to the key point sequence on said user-sliding trajectory;
(313) inquiring in said feature lexicon module by making individual Bi-grams character string in the Bi-grams character string set as query conditions, and fetching out probabilities of all the inquired-out Bi-grams character strings and words corresponding to individual probability;
(314) calculating a probability $P(C|W)$ that the user effectively wants to obtain a word C on precondition that the user inputs a sliding trajectory W according to the following formula;

$$P(C|W) = P(\$r_1|C) \times P(r_1 r_2|C) \times \ldots \times P(r_{n-1} r_n|C) \times P(r_n\$|C) \times P(C);$$

Wherein $r_1 r_2 r_3 r_4 \ldots r_n$ is the key point sequence of sliding trajectory W; $\$r_1, r_1 r_2, \ldots r_{n-1} r_n, r_n\$$ is Bi-grams character string of the key point sequence of sliding trajectory W; P (C) is word frequency that the word C appears; and $ is a special character for marking the start and the end;

(315) calculating the rough matching degree match_metricP $(C|W)$ between the sliding trajectory and the word C according to the following formula:

$$\text{match\_metric}P(C|W) = \log P(\$r_1|C) + \log P(r_1 r_2|C) + \ldots + \log P(r_{n-1} r_n|C) + \log P(r_n\$|C) + \log P(C);$$

Wherein, log represents logarithmic operation.

In the method for implementing the sliding input of a text based upon an on-screen soft keyboard on an electronic equipment, calculating the rough matching degree between words in said feature lexicon module and said user-sliding trajectory feature set may also include the following steps:

(321) the system receiving a partial sliding trajectory V input by the user, wherein such partial sliding trajectory V is a preorder trajectory of the complete sliding trajectory W meant to be input by the user;
(322) extracting length of the partial sliding trajectory and the key point sequence on the partial sliding trajectory according to said partial sliding trajectory V;
(323) obtaining corresponding Bi-grams character string set according to the key point sequence on said partial sliding trajectory;
(324) making individual Bi-grams character string in the Bi-grams character string set as query conditions so as to inquire in said feature lexicon module, and fetching out probabilities of all the inquired-out Bi-grams character string and words corresponding to individual probability;
(325) calculating a probability $P(C|W)$ that the user effectively wants to obtain a word C on precondition that the user inputs a partial sliding trajectory V according to the following formula;

$$P(C|V) = P(\$r_1|C) \times P(r_1 r_2|C) \times \ldots \times P(r_{k-1} r_k|C) \times P(r_k\$|C) \times P(C);$$

Wherein, $r_1 r_2 r_3 r_4 \ldots r_n$ is the key point sequence of the complete sliding trajectory W; $r_1 r_2 r_3 r_4 \ldots r_k$ is the key point sequence of the partial sliding trajectory V, with k≤n and $\$r_1, r_1 r_2, \ldots r_{k-1} r_k, r_k\$$ is a Bi-grams character string of the key point sequence of the partial sliding trajectory V; P(C) is word frequency that the word C appears; and $ is a special character for marking the start and the end;

(326) calculating the rough matching degree match_metricP $(C|V)$ between the partial sliding trajectory V and the word C according to the following formula:

$$\text{match\_metric}P(C|V) = \log P(\$r_1|C) + \log P(r_1 r_2|C) + \ldots + \log P(r_{k-1} r_k|C) + \log P(r_k\$|C) + \log P(C);$$

Wherein, log represents logarithmic operation;

(327) taking the rough matching degree match_metricP $(C|V)$ between the partial sliding trajectory V and the word C as the rough matching degree match_metricP $(C|W)$ between the complete sliding trajectory W and the word C.

In the method for implementing the sliding input of a text based upon an on-screen soft keyboard on an electronic equipment, calculating the rough matching degree between words in said feature lexicon module and said user-sliding trajectory feature set may also include the following steps:

(331) setting initially a former partial sliding trajectory segment V as 0 by the system, and setting the rough matching degree match_metricP $(C|V)$ between the former partial sliding trajectory segment V and the word C as log P (C), wherein, P (C) is word frequency that the word C appears;

(332) detecting by the system that a staying time of the user on a certain point of the sliding trajectory exceeds staying time threshold preseted by the system;

(333) receiving by the system the whole sliding trajectory W input by the user before the current sliding-stop-and-staying;

(334) obtaining present sliding trajectory segment S according to the following formula, and extracting length of the present sliding trajectory segment S and the key point sequence on the present sliding trajectory segment S:

$$S=W-V;$$

(335) obtaining corresponding Bi-grams character string set according to the key point sequence on said present sliding trajectory segment S;

(336) taking individual Bi-grams character string in the Bi-grams character string set as query conditions in order to inquire in said feature lexicon module, and fetching out probabilities of all the inquired-out Bi-grams character string and words corresponding to individual probability;

(337) calculating an incremental rough matching degree match_metricP (C|S) between the present sliding trajectory segment S and the word C according to the following formula: match_metricP (C|S):

$$\text{match\_metric}P(C|S)=\log P(\$r_k|C)+ \log P(r_k r_{k+1}|C)+\ldots+\log P(r_{n-1}r_n|C+\log P(r_n\$|C);$$

wherein, log represents logarithmic operation; $r_k r_{k+1} \ldots r_n$ is the key point sequence of the present sliding trajectory segment S; $\$r_k,r_k r_{k+1} r_n \ldots r_n \$$ is a Bi-grams character string of the key point sequence of the present sliding trajectory segment S; and $ is a special character for marking the start and the end;

(338) calculating the rough matching degree match_metricP (C|W) between the whole sliding trajectory W and the word C according to the following formula:

$$\text{match\_metric}P(C|W)=\text{match\_metric}P(C|V)+\text{match\_metric}P(C|S);$$

(339) setting former partial sliding trajectory segment V as the whole sliding trajectory W, and setting the rough matching degree match_metricP (C|V) between the former partial sliding trajectory segment V and the word C as the rough matching degree match_metricP (C|W) between the whole sliding trajectory W and the word C;

(3310) taking the rough matching degree match_metricP (C|W) between the whole sliding trajectory W and the word C as the rough matching degree match_metricP (C|T) between the complete sliding trajectory T and the word C.

In the method for implementing the sliding input of a text based upon an on-screen soft keyboard on an electronic equipment, calculating a similarity between the ideal sliding trajectory feature of each word in the original chosen word set and said user-sliding trajectory feature set, and obtaining a follow-up chosen word set by sorting as well as matching and filtering includes the following steps:

(41) calculating a linear matching distance between ideal trajectory of words in said original chosen word set and said user-sliding trajectory feature set;

(42) if the linear matching distance is smaller than the linear matching distance threshold preseted by the system, adding corresponding word into the follow-up chosen word set;

(43) returning to above step (41), until every word in the original chosen word set has been traversed.

In the method for implementing the sliding input of a text based upon an on-screen soft keyboard on an electronic equipment, calculating the linear matching distance between ideal trajectory of words in said original chosen word set and said user-sliding trajectory feature set, includes the following steps:

(411) extracting ideal word key point sequence according to ideal trajectory of words, and extracting the key point sequence on the user-sliding trajectory according to said user-sliding trajectory feature set;

(412) calculating a matched distance match_metric between a first key point $r_1$ in the key point sequence on the user-sliding trajectory and a first key point $u_1$ in the ideal word key point sequence, according to the following formula:

$$\text{match\_metric}=\text{distance}(r_1,u_1)\times w[r_1];$$

Wherein, distance (p, q) is a distance between a point p and a point q; $w[r_1]$ is a weight of the key point $r_1$;

(413) determining whether or not distance distance $(r_i, u_j)$ between next key point $r_i$ in the key point sequence on the user-sliding trajectory and the first key point $u_i$ in the ideal word key point sequence is smaller than the matched distance threshold;

(414) if so, calculating a matched distance match_metric according to the following formula:

$$\text{match\_metric}=\text{match\_metric}+\text{distance}(r_i,u_j)\times w[r_i];$$

wherein, $w[r_i]$ is a weight of the key point $r_i$;

moreover, individually increasing i and j by 1 and then proceeding to step (416);

(415) if not, recording the distance distance $(r_i, u_j)$ unmatched key point set;

(416) determining whether or not all key points in the key point sequence on said user-sliding trajectory have been traversed or all key points in ideal word key point sequence have been traversed;

(417) if not, returning to above step (413); (418) if so, determining whether or not said unmatched key point set is empty; (419) if not, calculating a matched distance match_metric according to the following formula:

$$\text{match\_metric}=\text{match\_metric}+\Sigma_{d_i \in S}(d_i * w[r_i]);$$

wherein, $d_i$=distance $(r_i, u_j)$, and S is an unmatched key point set;

(4110) determining whether the traversed items are all key points in the key point sequence on the user-sliding trajectory or all key points in the ideal word key point sequence;

(4111) if the traversed items are all key points in the key point sequence on the user-sliding trajectory, calculating a matched distance match_metric according to the following formula:

$$\text{match\_metric}=\text{match\_metric}+\Sigma_{k=j}^{n}(c_k * w[u_k]);$$

wherein, $u_k$ are key points of ideal word key point sequence that have not been traversed, k=j, j+1, . . . , n, with n being the total number of key points in the ideal word key point sequence; $c_k$ is the shortest distance from key point $u_k$ to the user-sliding trajectory;

(4112) if the traversed items are all key points in the ideal word key point sequence, calculating a matched distance match_metric according to the following formula:

$$\text{match\_metric}=\text{match\_metric}+\Sigma_{k=i}^{m}(c_k * w[r_k]);$$

wherein, $r_k$ are key points of the key point sequence on the user-sliding trajectory that have not been traversed, k=i, i+1, m, with m being the total number of key points in the key point sequence on the user-sliding trajectory, $c_k$ is the shortest distance from key point $r_k$ to the ideal trajectory of the word;

(4113) taking said matched distance match_metric as the linear matching distance between the ideal trajectory of the word and said user-sliding trajectory feature set.

In the method for implementing the sliding input of a text based upon an on-screen soft keyboard on an electronic equipment, the distances are Euclidean distances.

In the method for implementing the sliding input of a text based upon an on-screen soft keyboard on an electronic equipment, the following steps may be performed before step (41):

(40) performing trajectory segmentation on the ideal trajectories of words in the original chosen word set according to said user-sliding trajectory feature set.

In the method for implementing the sliding input of a text based upon an on-screen soft keyboard on an electronic equipment, performing trajectory segmentation on the ideal trajectories of words in the original chosen word set according to said user-sliding trajectory feature set includes the following steps:

(401) extracting ideal word key point sequence according to the ideal trajectory of the word, and according to said user-sliding trajectory feature set, extracting length of the user-sliding trajectory and the key point sequence on the user-sliding trajectory;

(402) calculating a path length PathLen[i] of each ideal key point $C_i$ on the ideal trajectory of the word according to the following formula:

PathLen[$i$]=PathLen[$i$−1]+distance($C_{i-1}$,$C_i$);

Wherein, i=2, 3, ..., n, with n being the total number of ideal word key points; PathLen[1]=0; distance ($C_{i-1}$, $C_i$) is a distance between ideal word key point $C_{i-1}$ and $C_i$;

(403) determining respectively whether the length PathLen$_R$ of said user-sliding trajectory satisfies the following relations:

|PathLen$_R$−PathLen[$i$]|≤$T_{len\_diff}$;

Wherein, i=2, 3, ..., n; and $T_{len\_diff}$ is trajectory segmentation length threshold preseted by the system;

(404) if they are satisfied, adding the ideal word key point $C_i$ into the segmentation point candidate set;

(405) repeating above steps (403) to (404), until all ideal word key points of the ideal word key point sequence have been traversed;

(406) determining respectively whether individual ideal word key point $C_i$ in said segmentation point candidate set satisfies the following relations:

distance($P_{end}$,$C_j$)<$T_{dis\_diff}$;

wherein, i=2, 3, ..., n; $P_{end}$ is the last key point of the key point sequence on the user-sliding trajectory; $T_{dis\_diff}$ is a trajectory segmentation distance threshold preseted by the system;

(407) if they are satisfied, segmenting said ideal trajectory of the word according to the ideal word key point, and adding a trajectory segment from the start point of the ideal trajectory of the word to the ideal word key point $C_i$, as the ideal word sub-trajectory, into the segmented ideal word sub-trajectory set;

(408) repeating above steps (406) to (407), until all ideal word key points in the segmentation point candidate set have been traversed.

In the method for implementing the sliding input of a text based upon an on-screen soft keyboard on an electronic equipment, trajectory segmentation length threshold $T_{len\_diff}$ is obtained by means of a large number of training data.

In the method for implementing the sliding input of a text based upon an on-screen soft keyboard on an electronic equipment, trajectory segmentation distance threshold $T_{dis\_diff}$ is obtained by means of a large number of training data.

In the method for implementing the sliding input of a text based upon an on-screen soft keyboard on an electronic equipment, calculating the linear matching distance between ideal trajectory of words in said original chosen word set and said user-sliding trajectory feature set is specifically as follows:

respectively taking individual ideal word sub-trajectory in said segmented ideal word sub-trajectory set as the ideal trajectory of the word, performing above steps (411) to (4112), and choosing the smallest matched distance among the calculated individual matched distances match_metric, as the linear matching distance between the ideal trajectory of the word and said user-sliding trajectory feature set.

In the method for implementing the sliding input of a text based upon an on-screen soft keyboard on an electronic equipment, accurately calculating an accurate similarity between the ideal sliding trajectory feature of each word in the follow-up chosen word set and the user-sliding trajectory feature set includes the following steps:

(51) as for the ideal sliding trajectory feature of each word in said follow-up chosen word set, obtaining corresponding ideal trajectory point sequence;

(52) as for said user-sliding trajectory, obtaining the user-trajectory point sequence;

(53) calculating a similar distance between the ideal sliding trajectory of each word and the user-sliding trajectory according to said ideal trajectory point sequence and the user-trajectory point sequence;

(54) taking said similar distance as the accurate similarity between the ideal sliding trajectory feature of this word and the user-sliding trajectory feature set.

In the method for implementing the sliding input of a text based upon an on-screen soft keyboard on an electronic equipment, calculating a similar distance between the ideal sliding trajectory of each word and the user-sliding trajectory according to said ideal trajectory point sequence and the user-trajectory point sequence includes the following steps:

(531) as for each point S[i] in said user-trajectory point sequence, suming up distances between all points t[j] in ideal trajectory point sequence and the point S[i] according to the following formula so as to obtain the similar distance DTW[i, j]:

DTW[$i$,$j$]=cost+min(DTW[$i$−1,$j$],DTW[$i$,$j$−1],DTW[$i$−1,$j$−1]);

wherein, cost=distance(s[i], t[j]); distance (s[i], t[j]) is a distance between point s[i] and point t[j]; DTW[0, 0]=0, i=1, 2, 3, ..., n, with n being the total number of points in the user-trajectory sampling point sequence; j=1, 2, 3, m, with m being the total number of points in ideal trajectorysampling point sequence; min (DTW[i−1, j], DTW[i, j−1], DTW[i−1, j−1]) is a minimum value among DTW[i−1, j], DTW[i, j−1] and DTW[i−1, j−1];

(532) repeating above steps (531), until all points in said ideal trajectory point sequence have been traversed, and obtaining a summed similar distance DTW[n, m] between the ideal sliding trajectory and the user-sliding trajectory.

In the method for implementing the sliding input of a text based upon an on-screen soft keyboard on an electronic equipment, the following steps may be performed before step (51):

(50) performing trajectory segmentation on the ideal trajectory of the word in the follow-up chosen word set according to said user-sliding trajectory feature set.

In the method for implementing the sliding input of a text based upon an on-screen soft keyboard on an electronic equipment, performing trajectory segmentation on the ideal trajectory of the word in the follow-up chosen word set according to said user-sliding trajectory feature set includes the following steps:

(501) extracting the ideal word key point sequence according to the ideal trajectory of the word, and extracting length of the user-sliding trajectory and the key point sequence on the user-sliding trajectory according to said user-sliding trajectory feature set;

(502) calculating a path length PathLen[i] of each ideal word key point $C_i$ on the ideal trajectory of the word according to the following formula:

PathLen[i]=PathLen[i−1]+distance($C_{i-1}$, $C_i$);

wherein, i=2, 3, ..., n, with n being the total number of ideal word key points; PathLen[1]=0; distance ($C_{i-1}$, $C_i$) is distance between ideal word key points $C_{i-1}$ and $C_i$;

(503) determining respectively whether ength $PathLen_R$ of said user-sliding trajectory satisfies the following relations:

|$PathLen_R$−PathLen[i]|≤$T_{len\_diff}$;

wherein, i=2, 3, ..., n, $T_{len\_diff}$ is trajectory segmentation length threshold preseted by the system;

(504) if they are satisfied, adding ideal word key point $C_i$ into the segmentation point candidate set;

(505) repeating above steps (503) to (504), until all ideal word key points in the ideal word key point sequence have been traversed;

(506) determining respectively whether individual ideal word key point $C_i$ in said segmentation point candidate set satisfies the following relations:

distance($P_{end}$, $C_i$)<$T_{dis\_diff}$;

wherein, i=2, 3, ..., n; $P_{end}$ is the last key point in the key point sequence on the user-sliding trajectory, $T_{dis\_diff}$ is trajectory segmentation distance threshold preseted by the system;

(507) if they are satisfied, segmenting said ideal trajectory of the word according to the ideal word key point, and adding a trajectory segment from the start point of the ideal trajectory of the word to the ideal word key point $C_i$, as the ideal word sub-trajectory, into the segmented ideal word sub-trajectory set;

(508) repeating above steps (506) to (507), until all ideal word key points in the segmentation point candidate set have been traversed.

In the method for implementing the sliding input of a text based upon an on-screen soft keyboard on an electronic equipment, the trajectory segmentation length threshold $T_{len\_diff}$ is obtained by means of a large number of training data.

In the method for implementing the sliding input of a text based upon an on-screen soft keyboard on an electronic equipment, the trajectory segmentation distance threshold $T_{dis\_diff}$ is obtained by means of a large number of training data.

In the method for implementing the sliding input of a text based upon an on-screen soft keyboard on an electronic equipment, calculating a similar distance between the ideal sliding trajectory of each word and the user-sliding trajectory according to said ideal trajectory point sequence and the user-trajectory point sequence is specifically as follows:

taking individual ideal word sub-trajectory in said segmented ideal word sub-trajectory set as the ideal trajectory of the word one by one to perform above steps (531) to (532), and choosing the smallest similar distance among all the calculated individual similar distance DTW[n, m], as the similar distance between the ideal sliding trajectory of the word and the user-sliding trajectory.

In the method for implementing the sliding input of a text based upon an on-screen soft keyboard on an electronic equipment, obtaining the candidate result of words by sorting according to the accurate similarity, word frequency and user input history information includes the following steps:

(61) calculating accurate matching distance match_metric1 between each word in the follow-up chosen word set and the user-sliding trajectory feature set according to the following formula:

$$\text{match\_metric1} = DTW[n, m] * \left(\left(1 + \frac{\text{real\_path\_len}}{\text{ideal\_path\_len} - 1}\right) * a\right) * \left(1 + \log\frac{1}{\text{word\_freq}} * b\right) * \left(1 + \left(1 - \frac{\text{word\_len}}{\text{matched\_word\_len}}\right) * c\right)$$

wherein, real_path_len is length of the user-sliding trajectory; ideal_path_len is length of ideal trajectory of the word prefix; word_freq is word frequency of the word prefix; word_len is the number of characters that constitute the word prefix; matched_word_len is the number of characters that constitute word; a, b, c are respectively weight adjusting factors;

(62) sorting by magnitude all the accurate matching distances match_metric1;

(63) choosing a word corresponding to the smallest accurate matching distance match_metric1 according to the number of candidate words preseted by the system, as the candidate result of words.

In the method for implementing the sliding input of a text based upon an on-screen soft keyboard on an electronic equipment, the weight adjusting factor b,c are respectively obtained by means of a large number of training data.

The system and method for implementing the sliding input of a text based upon an on-screen soft keyboard on an electronic equipment of the present invention are applied. Since there are six main functional modules (wherein, the user interface module is mainly responsible for interacting with the user, including recording user-sliding trajectories and showing the user the results retuerned by the engine; the trajectory feature extraction module is mainly responsible for converting user-sliding trajectories recorded by the UI into a feature set that can be processed, including smoothing, normalizing, feature extracting of trajectories; the feature lexicon establishment module is able to extract corresponding ideal trajectory feature from any word in a dictionary and store them in the feature lexicon; the rough classifying and filtering module is able to quickly search out a set of hundreds of possible words that resemble the trajectory out of the feature lexicon according to features of the user-sliding trajectory; the rough matching and filtering module is able to use features of key points to calculate the similarity between the set of previous search results and the sliding trajectories, rank according to the similarity, and search out several possible words; the accurate matching and sorting module is able to accurately calculate theoretical similarity between sliding trajectory and actual user-sliding trajectory with respect to each candidate word, then comprehensively consider the similarity and integrity of sliding trajectory (prefix matching requirements), and word frequency, user input history information and so on to sort candidate words, and return to the user interface module), various features in the sliding trajectory can be correctly used, the speed is guaranteed, and a function of timely providing recommended candidate words after staying on keyboard for a short moment during sliding is realized according to the preorder trajectory of the input portion (i.e. input word), in combination with associative word technology, by means of skillfully using a forecasting-between-slidings input; thus, a sliding distance is obviously decreased, the input speed and accuracy of words are effectively improved, and the operation complexity of users is obviously reduced, which realize a simple implementation process, convenient and fast utilization, stable and reliable working performance and an extensive applicable scope, prompting the large-scale application of electronic equipment touch screen information input method, and bringing the work and life of people huge convenience.

DETAILED DESCRIPTION OF THE PREFERRED EMBODIMENTS

In order to more clearly illustrate the technical contents of the invention, following embodiments are used to explain the invention.

Figure 1:
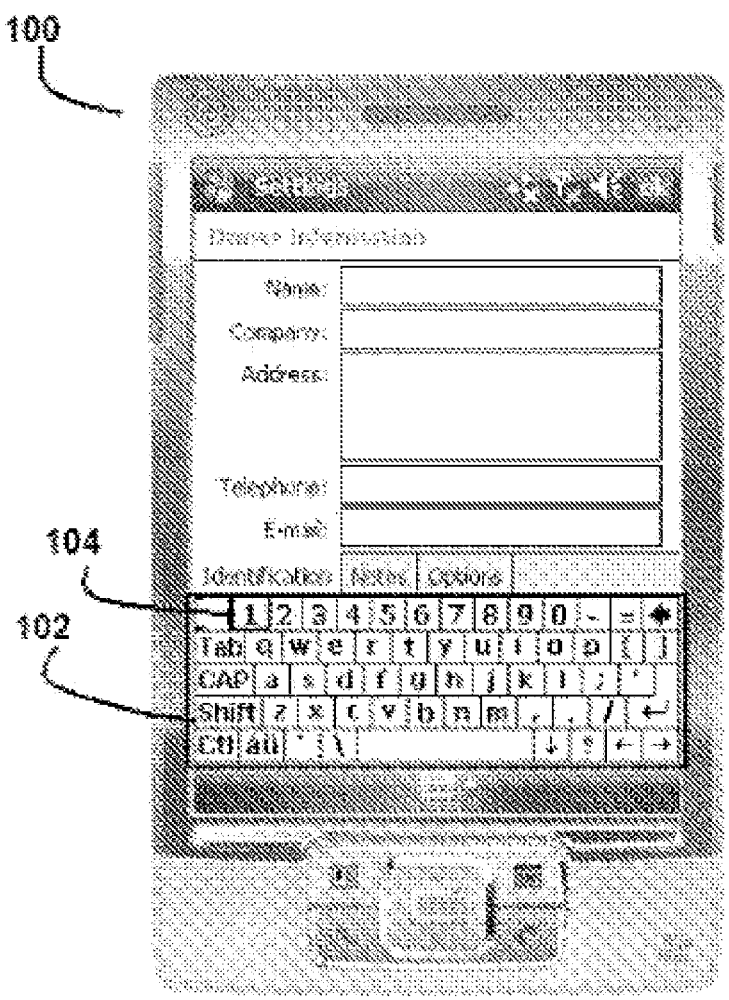
FIG. 1 is a diagram of a soft keyboard layout on the touch screen of an electronic equipment in the prior art.

First of all, representative forms of the system of the invention are introduced:

As shown in FIG. 1, an illustrative electronic equipment of the system for implementing the sliding input of a text based upon an on-screen soft keyboard is described. The equipment may include a touch screen, and there may be a soft keyboard area on the touch screen, for receiving input signal of the user. The soft keyboard area can display one of keyboard layouts (for example, QWERTY layout).

Figure 1A:
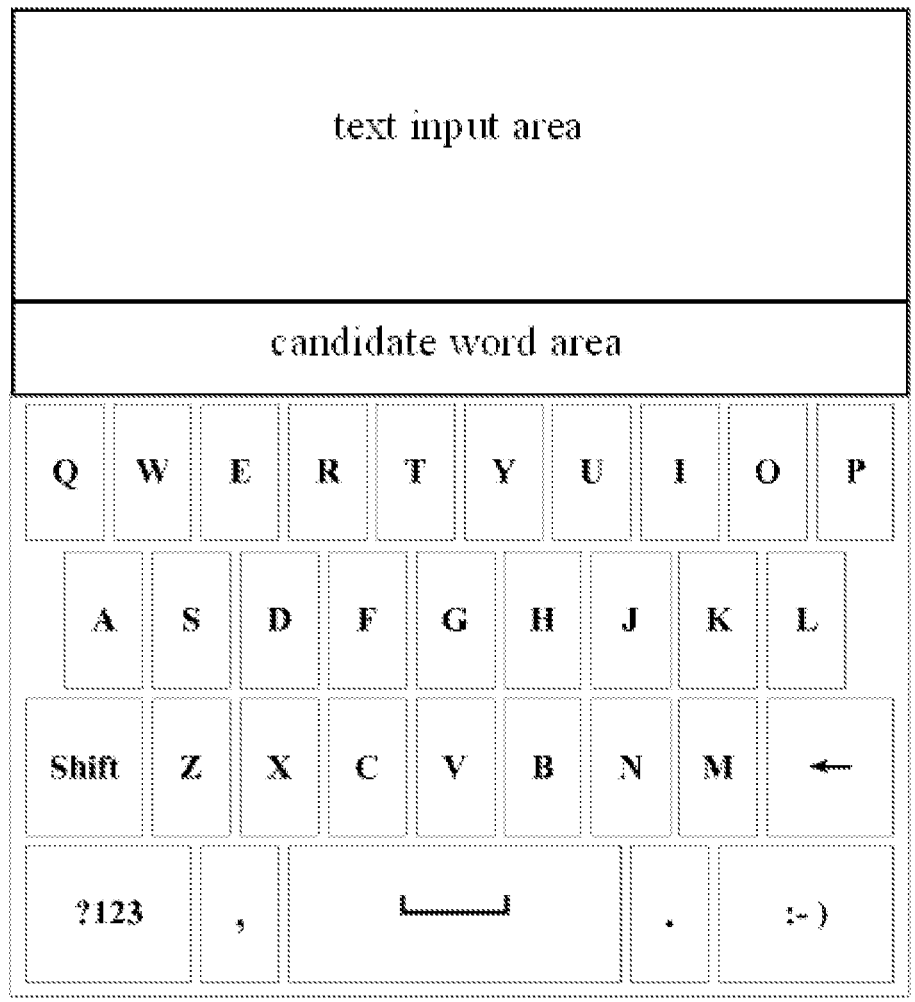
FIG. 1A is a diagram of contents displayed on the electronic equipment applying the present invention.

Again, as shown in FIG. 1A, contents displaying on the electronic equipment are described, which may include a text input area. The texts or words input by the user may be inserted in the text input area. The electronic equipment may also include a candidate word area on its display screen, which may display a list of possible candidate word input by the system. The candidate word area is optional in this embodiment.

The system detects touching operations of the user. When the user's sliding operation on the keyboard area is detected, related data of the sliding trajectory will be recorded. In some embodiments, the user-sliding trajectory will be displayed on the screen. When the user lifts the contact point so as to end the sliding, or when the user stops sliding for a time threshold, the system will find out the possible candidate words by analyzing the user's sliding trajectory.

In some embodiments, the candidate word area may display a list of candidate words for the user to select. In the candidate word list, there may be a preferable candidate word (for example, with highest matching degree) which may be a default candidate word. When the user fails to make any operation to the candidate word list, but rather continues a following sliding operation, this default candidate word will be automatically input into the text input area.

In some embodiments, the candidate word area may be omitted. the system directly input the next preferable candidate word as the default candidate word, into the text input area.

Figure 9:
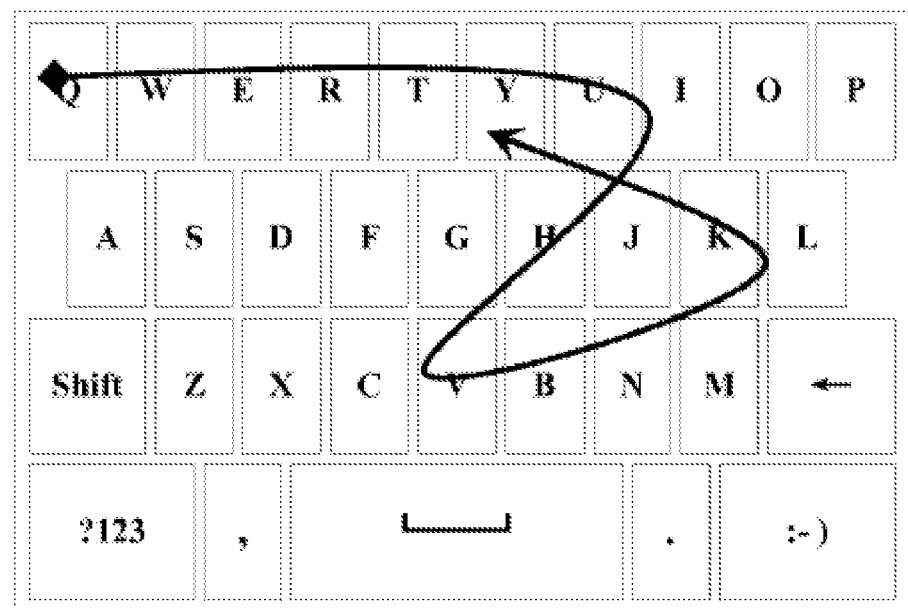
FIG. 9 is a diagram showing the user's another actual sliding trajectory in the method for implementing the sliding input of a text based upon an on-screen soft keyboard on an electronic equipment of the present invention.

Again, as shown in FIG. 9, an input process for an user inputting an English word "quickly" is described. When the user sequentially slides across approximate positions of letters "Q", "U", "I", "C", "K", "L", "Y" according to a trajectory shown in the figure, and lifts the contact point (or stays there for a certain time duration), the system will find out possible candidate words, and may display them in the candidate word area while making the preferable candidate word "quickly" as the default candidate word.

Figure 17:
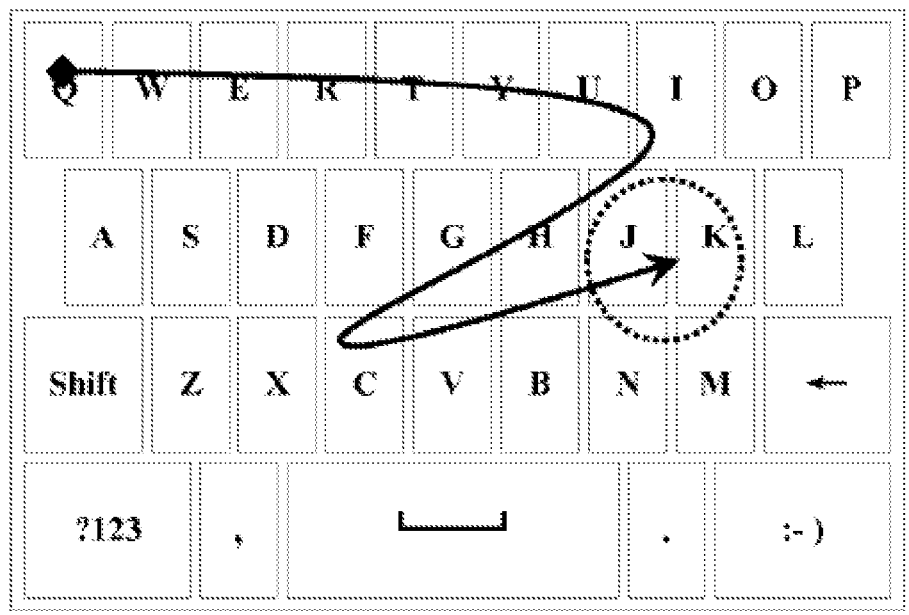
FIG. 17 is a diagram showing performing rough matching and accurate matching on the user's trajectory for the fourth time in a specific embodiment of the present invention.

Again, as shown in FIG. 17, another input process for an user inputting an English word is described. When the user sequentially slides across approximate positions of letters "Q", "U", "I", "C", "K" according to the trajectory shown in the figure, and stays for a certain time duration, the system may take "quickly" as the word for the preorder trajectory prediction and considers it as the candidate word. When the user finishes sliding in advance and lifts the contact point, the candidate word "quickly" may be selected as the input word.

Figure 2:
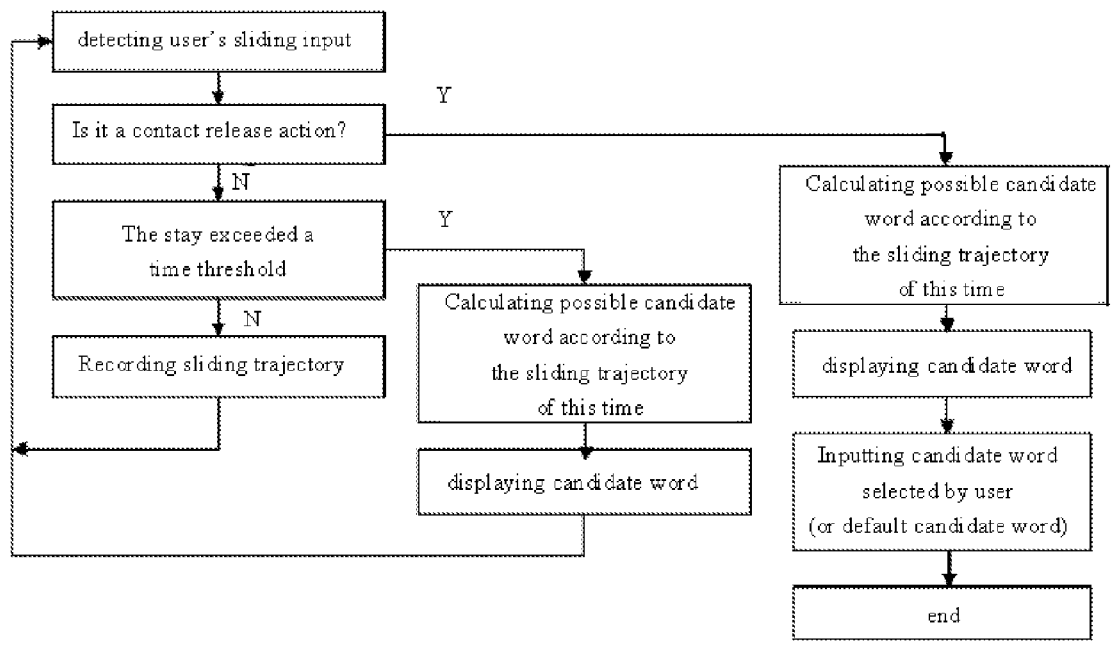
FIG. 2 is a complete flow chart of actual operations implemented by the system for implementing the sliding input of a text based upon an on-screen soft keyboard on an electronic equipment of the present invention.
Figure 2A:
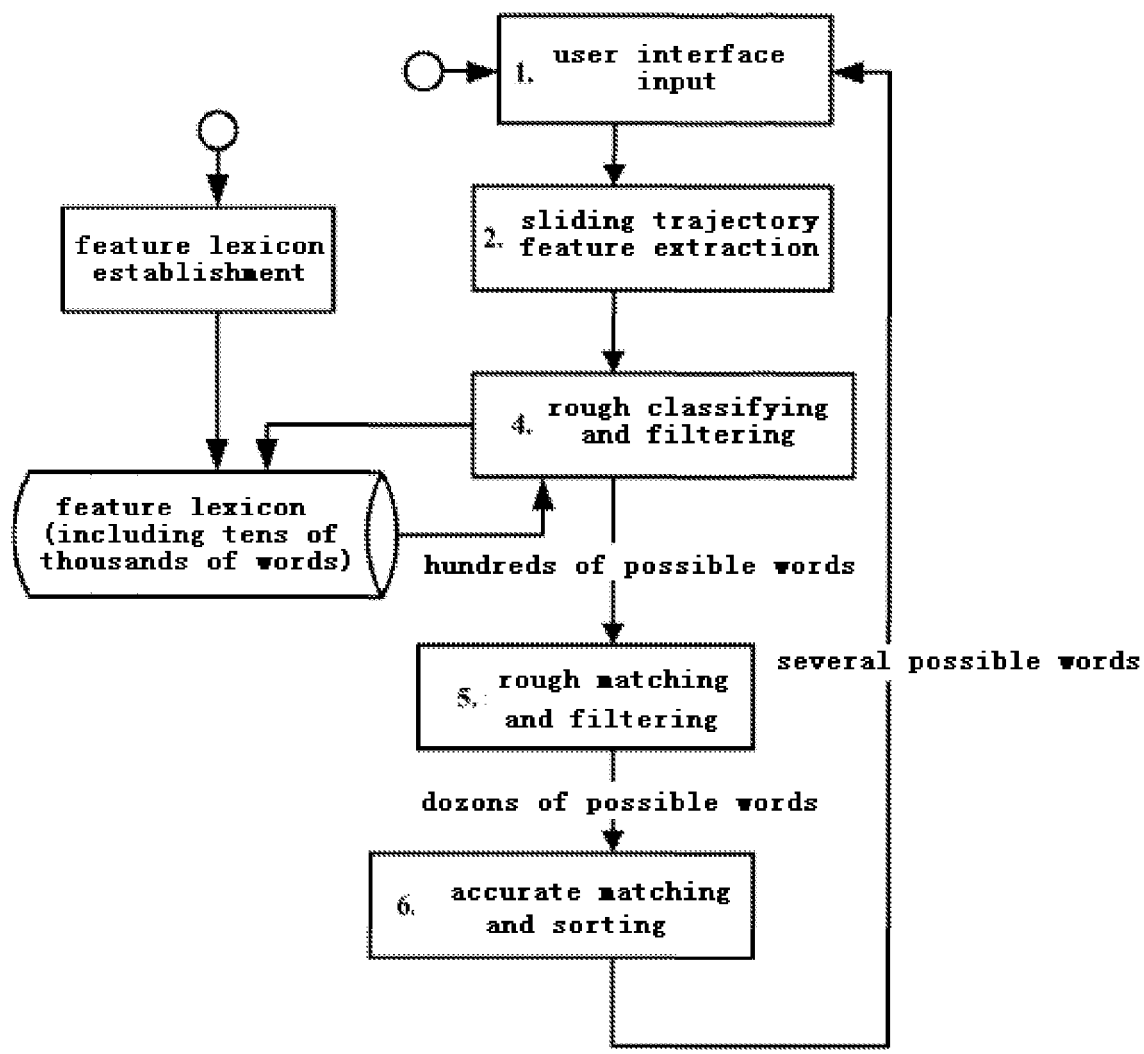
FIG. 2A is a complete flow chart of the method for implementing the sliding input of a text based upon an on-screen soft keyboard on an electronic equipment of the present invention.

Again, as shown in FIG. 2 which is the user a complete flow chart of actual operations of applying the system for implementing the sliding input of a text based upon an on-screen soft keyboard on an electronic equipment of the present invention, a complete flow chart of the embodiment is described as follows:

(1) the system detects the user's sliding input operation;

(2) the system determines whether the user lifts the contact point;

(3) if so, the following process is performed:

(a) the system finds out the possible candidate word according to the sliding trajectory of this time;

(b) the system displays the candidate word;

(c) the system inputs the candidate word selected by the user, and the process ends;

(4) if not, determining whether or not the user's stay after the sliding movement stops has exceeded a time threshold;

(5) if so, the following process is performed:

(a) the system finds out the possible candidate word according to the sliding trajectory of this time;

(b) the system displays the candidate word;

(c) returning to above step (1);

(6) if not, the sliding trajectory is recorded, and the process returns to above step (1).

wherein, the process of the present invention includes the following three critical technologies:

K-Grams inverted index;

trajectory segmentation;

incremental matching calculation.

In the invention, the application of K-Grams inverted index is an important means for the sliding input method to support preorder trajectory prediction matching, and it can realize the preorder trajectory prediction function based on the basic sliding input function without increasing additional space consumption. Because the property of K-Grams inverted index ensures great description of local characteristics of a word. Other methods (for example, redundancy storage of each prefix of each word) may also realize the same function, but its space consumption linearly increase with respect to the basic sliding input function.

Assuming that storage space of feature lexicon of the basic sliding input function requires M storage units, then realizing such storage by using K-Grams inverted index would certainly support the preorder trajectory prediction function, that's to say, size of storage space is still M. If redundant storage is additionally applied to each prefix of each word, then, even if redundant storage is only applied to the prefix of long words (assuming that the length is no less than 7) with length of prefix being no less than 3 (assuming that the number of long words take 30% of that of the lexion), the storage space will reach: M+(7−3)×M×30%=2.2M, which is 2.2 times of space consumption of storage means applied by the present invention.

In the invention, said basic sliding input function specifically refers to inputting a certain word by drawing a complete word trajectory; while the preorder trajectory predictionfunction refers to a situation that a certain word can be predicted only by drawing a trajectory connecting letters of first half of the word.

Figure 11:
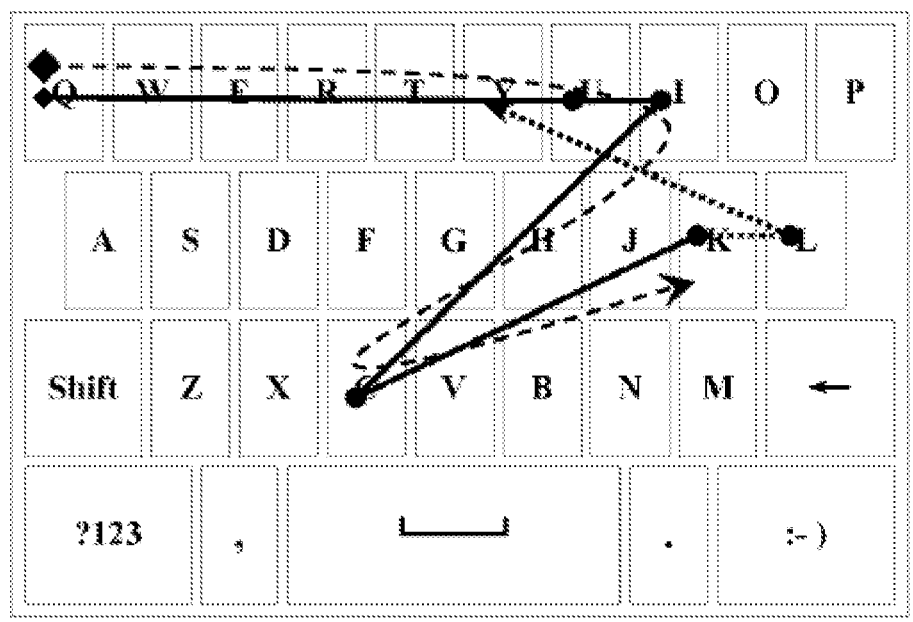
FIG. 11 is a diagram showing the trajectory segmentation for implementing word prefix matching function in the rough matching and filtering process of the method for implementing the sliding input of a text based upon an on-screen soft keyboard on an electronic equipment of the present invention.

The trajectory segmentation algorithm applied by the present invention is also an important precondition of the preorder trajectory prediction function of the present invention, which is applied in combination with the K-Grams inverted index, so that the computation performance of the present invention can be further improved. Trajectory segmentation algorithm applied by the present invention is as follows:

As shown in FIG. 11, dotted lines "............" and solid lines show ideal word trajectory of the word "quickly", and long broken lines "------" shows the actual sliding trajectory (while inputting "quickly", the sliding action stops when "k" has been reached and then stays with an expection to obtain a result of "quickly"). A problem to be solved by such an algorithm is to segment the ideal trajectory of the word into a first half portion and a latter half portion (shown as a black solid line and a black broken line), and to perform above matching process on features on the first half portion of the trajectory (the black solid line) or the trajectory itself and the actual sliding trajectory (red solid line is matched with the black solid line). The critical aspect is to solve the problem of how to find out a segmentation point ("k" in the figure).

Assuming that the candidate word set searched out in the fourth section is CandidateWords $(W_1, W_2, \ldots, W_i, \ldots, W_N)$, as for each candidate word Wi, algorithm steps are as follows:

(1) assuming that $W_i$ is composed of n characters, which represented by $W_i(C_1, C_2, \ldots C_i, \ldots C_n)$. Paths are calculated at the time that each $C_i$ is passed by, and are stored into PathLen[i], i.e. PathLen[i]=PathLen[i−1]+distance $(C_{i-1}, C_i)$, with i=2, 3, . . . , n.

(2) assuming that the length of the actual sliding trajectory is $PathLen_R$, with respect to a given threshold $T_{len\_diff}$, as for i=1, . . . n, if:

$$|PathLen_R - PathLen[i]| < T_{len\_diff};$$

then, $C_i$ is added into a candidate set C_Set which will be processed in step 3. In the end, C_Set having a size of m will be obtained, and m is usually no more than 3. wherein, $T_{len\_diff}$ can be obtained by training.

(3) assuming that the last point of the actual sliding trajectory is $P_{end}$, as for character $C_j$ (j=1, 2, . . . , m) in each C_Set, assuming that P ($C_j$) is a coordinate corresponding to $C_j$. Moreover, as for a given threshold $T_{dis\_diff}$, if distance $(P_{end}, P_{C_j}) < T_{dis\_diff}$, then $C_j$ is the point needed to be found. wherein, $T_{len\_diff}$ can be obtained by training.

1 to 3 possible segmentation points may be found out in above algorithm. Each point is treated as ending character of word, and subsequent candidate word calculation and matching process are performed, and then the smallest match_metric can simply be extracted.

Meanwhile, it should be pointed out that, applying other storing methods to store the feature lexicon may not need the process of trajectory segmentation; but the trajectory segmentation is necessary if the Bi-grams inverted index is used, or accuracy of the preorder trajectory predictionfunction will obviously decrease. The time complexity degree of the trajectory segmentation algorithm itself is low, so that the execution efficiency is high.

On the other hand, as for the incremental matching of the present invention, the calculation result of former matching can be used during calculation, and every time when the trajectory travels forward, only matching degree of currently added partial trajectory needs to be calculated, and current matching degree can be obtained by synthesizing matching degree of preorder. In this way, reduplicated calculation can be avoided, so that matching speed can be improved to some extent. This technology also depends on the Bi-grams inverted index storage method.

Meanwhile, specific process of calculation of the candidate word will be described in detail in the following system implemented method.

A systematic implementation method of the present invention is specifically as follows:

the system for implementing the sliding input of a text based upon an on-screen soft keyboard on an electronic equipment may comprise:

(1) a feature lexicon module, for storing ideal sliding trajectory features of words;

(2) a user interface module, for processing interactions with a user, recording user-sliding trajectories, and displaying a result of candidate words;

(3) a sliding trajectory feature extraction module, for receiving the the user-sliding trajectories recorded by said user interface module, and converting them into a user-sliding trajectory feature set to be processed;

(4) a rough classifying and filtering module, for receiving the user-sliding trajectory feature set output from said sliding trajectory feature extraction module, obtaining words having similar ideal sliding trajectory feature with the user-sliding trajectory feature set by classifying and filtering in said feature lexicon module, and composing a original chosen word set;

(5) a rough matching and filtering module, for receiving the original chosen word set output from said rough classifying and filtering module, using a key point feature to calculate a similarity between the ideal sliding trajectory feature of each word in the original chosen word set and said user-sliding trajectory feature set, and obtaining a follow-up chosen word set by sorting according to the similarity as well as matching and filtering.

The system for implementing the sliding input of a text based upon an on-screen soft keyboard on an electronic equipment may further comprise:

(6) an accurate matching and sorting module, for receiving the follow-up chosen word set delivered from said rough matching and filtering module, accurately calculating an accurate similarity between the ideal sliding trajectory feature of each word in the follow-up chosen word set and said user-sliding trajectory feature set, obtaining the result of candidate words by sorting according to the accurate similarity, word frequency, user input history information, and feed-backing the result of candidate words to said user interface module.

Moreover, in order to create the feature lexicon module, the system may further comprise:

(7) a feature lexicon establishment module, for extracting corresponding ideal sliding trajectory features with respect to word in a dictionary and storing them in said feature lexicon module;

the feature lexicon establishment module usually do not be arranged on the electronic equipment, rather, it is provided on computer or other stationary equipment, and it only needs to be executed in advance. Therefore, in the actual system for implementing the sliding input of a text based upon an on-screen soft keyboard on an electronic equipment, such module is always not included.

In actual applications, the system for implementing the sliding input of a text based upon an on-screen soft keyboard on an electronic equipment the present invention includes:

an UI layer—mainly responsible for interacting with the user, including recording user-sliding trajectories and showing the user the results returned by the engine.

a trajectory feature extraction module—mainly responsible for converting user-sliding trajectories recorded by the UI into a feature set that can be processed, including smoothing, normalizing, feature extracting of trajectories.

a feature lexicon establishment module—extract corresponding ideal trajectory feature from any word in a dictionary and store them in the feature lexicon.

a rough classifying and filtering module—quickly search out a set of hundreds of possible words that resemble the trajectory out of the feature lexicon according to features of the user-sliding trajectory by using fast algorithm. The correct application of various features of sliding trajectory is critical for this step.

a rough matching and filtering module—use features of key points to calculate the similarity between the set of previous search results and the sliding trajectories, rank according to the similarity, and search out several possible words. Time complexity degree of this step is higher than that of last step, however, since a set of hundreds of words is searched out at last step for computation in this step, the speed is guaranteed.

an accurate matching and sorting module—accurately calculate theoretical similarity between sliding trajectory and actual user-sliding trajectory with respect to each candidate word, then comprehensively consider the similarity and integrity of sliding trajectory (prefix matching requirements), and word frequency, user input history information and so on to sort candidate words, and return to the user interface module.

As shown in FIG. 2A to FIG. 12, the method for implementing the sliding input of a text based upon an on-screen soft keyboard on an electronic equipment based on above system comprises the following steps:

Step I:

a feature lexicon establishment processing operation, for extracting ideal sliding trajectory features corresponding to a word in a dictionary and storing them in said feature lexicon module. The ideal sliding trajectory features include ideal trajectory lengths of ideal trajectories of words and an ideal key point sequence of words, and said ideal key point sequence is an ordered combination of key points on the ideal trajectory of the word. The key points include starting and ending key points as well as ordinary key points of the trajectory, and said ordinary key points are inflection points on the trajectory.

Such step I is not an essential step of the present invention; in fact, any other processing methods that can realize the same or corresponding technical effects can be applied. Wherein, in the method for implementing the sliding input of a text based upon an on-screen soft keyboard on an electronic equipment, the feature lexicon module includes a word feature table and an ideal word trajectory index table; fields in said word feature table include word identification, word content, ideal trajectory length and word length; said ideal word trajectory index table refer to the word identification in the word feature table; the ideal trajectory of the word may be a large number of similar trajectories of corresponding words extracted from sliding trajectories of the user according to a large number of training data; or, the ideal trajectory of the word may be straight lines connecting centers of sequential letters of the word on the on-screen soft keyboard. Said extracting the ideal sliding trajectory features corresponding to a word and storing them into the feature lexicon module includes the following steps:

(a) extracting ideal trajectory length and word length of the word, mading a count on the word frequency of the word, and storing it into a corresponding record in said word feature table, wherein said word length is the number of characters included in the word; such mading a count on the word frequency of the word may be an independent statistics or a statistical analysis based on a corpus derived from internet;

(b) performing Bi-grams segmentation on the word so as to obtaining a Bi-grams character string subset;

(c) calculating probability $P(X_{k-1}X_k|C)$ of each Bi-grams character string in the Bi-grams character string subset according to the following formula:

$$P(X_{k-1}X_k|C)=P(X_{k-1}|C) \times P(X_k|C);$$

wherein, C is word; $X_{k-1}$ and $X_k$ both are key points on the ideal trajectory of the word; $P(X_k|C)$ is probability that key point $X_k$ appears in the word; the probability that key point appears in the word may be a word-based key-point-present probability calculated according to a number of actual trajectories corresponding to the word in a large number of training data, or may be a key-point-present probability preseted by the system; in specific embodiments of the present invention, the key-point-present probability preseted by the system may be equal to 1, and the key points are exactly located on corresponding letters of the word.

(d) establishing a corresponding Bi-grams inverted index according to probability $P(X_{k-1}X_k|C)$ of each Bi-grams character string in said Bi-grams character string subset and word identification of corresponding word W within the word feature table;

(e) configuring a global ideal word trajectory index table according to all the Bi-grams inverted index corresponding to said Bi-grams character string subset.

In actual applications, as for the ideal trajectory of the word, during feature lexicon configuring stage, by means of a large number of training data, the present invention can extract a large number of similar trajectories of corresponding word such as "quickly" from the user-sliding trajectory, so as to extract features.

Figure 7:
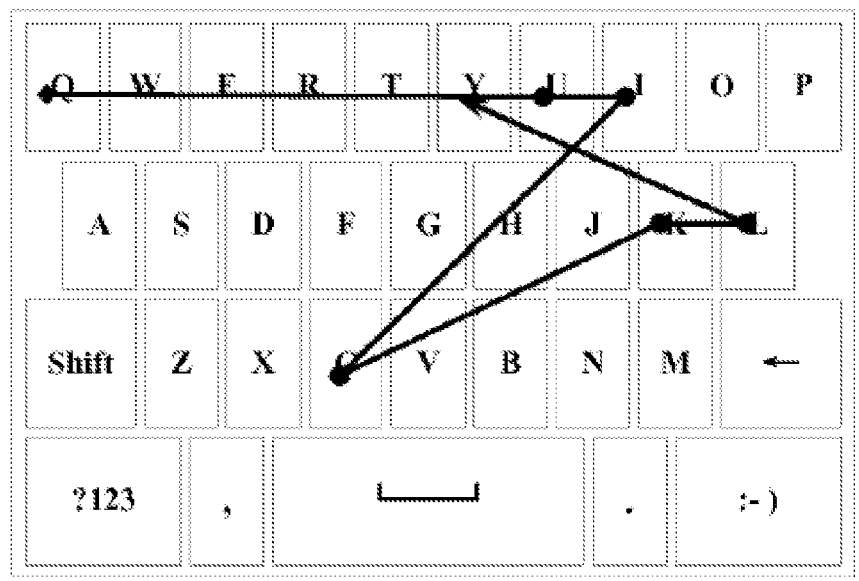
FIG. 7 is a diagram showing the ideal trajectory of a word in the method for implementing the sliding input of a text based upon an on-screen soft keyboard on an electronic equipment of the present invention.

If training data is absent, assumption may be made that the ideal trajectory is a straight line connecting centers of sequential letters of the word on the virtual keyboard; as shown in FIG. 7, a straight line connecting sequential letters of word "quickly" is be treated as ideal trajectory.

wherein:

ideal trajectory length—as for the ideal trajectory of each word, there will be a calculable ideal trajectory length, and as for assumption of ideal trajectory, it is a sum of distances of center points of every two successive letters.

ideal word key point sequence—the ideal key point sequence corresponding to the word is an ordered combination of key points on a word ideal path.

the actual key point sequence of the word—an ordered combination of key points on an actual path of a correspondent word input by the user.

Figure 8:
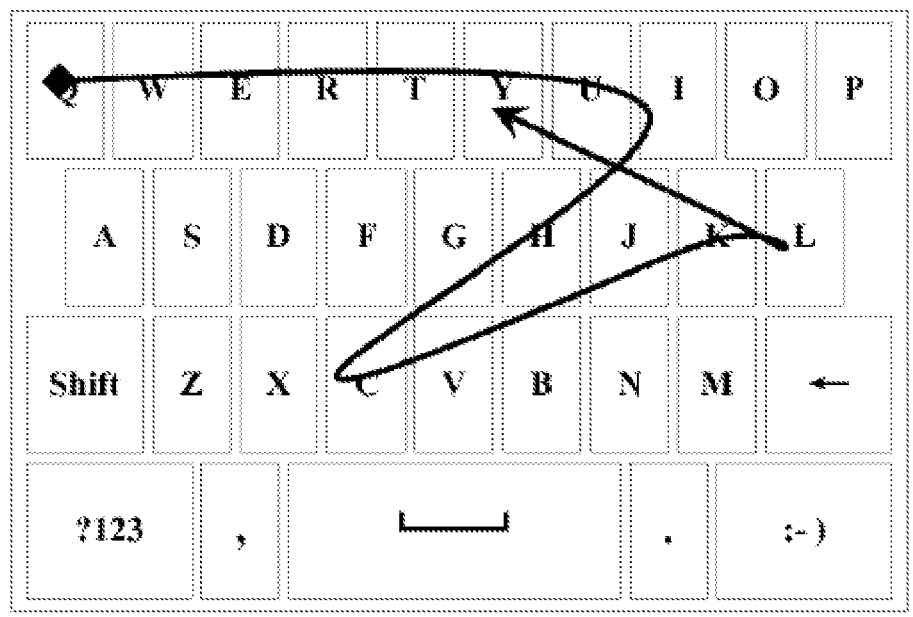
FIG. 8 is a diagram showing the user's actual sliding trajectory in the method for implementing the sliding input of a text based upon an on-screen soft keyboard on an electronic equipment of the present invention.

As for the ideal trajectory of each word, there will be an extractable ideal key point. As shown in FIG. 8, according to a certain user-sliding trajectory, key points of the trajectory corresponding to word "quickly" are (q, i, c, l, y). As shown in FIG. 9, corresponding to word "quickly", key points corresponding to another trajectory input by the user may also be (q, i, v, l, y). Due to custom or some interferences, the sliding arrivals at "v" rather than "c". Therefore, the ideal key point sequences of word "quickly" will be "qicly" and "qivly". During feature lexicon configuring stage, by means of a large number of training data (i.e. a large number of actual trajectories corresponding to each word), the probability of appearance of each key point of such word can be calculated. For example, as for word "quickly", in case of above two trajectories of trajectory (q, i, c, l, y) and quickly) trajectory (q, i, v, l, y), probabilities of key points P (q|quickly), P (i|quickly), P (e|quickly), P (v|quickly), P (l|quickly) and P (y|quickly) are respectively 1, 1, 0.5, 0.5, 1 and 1. The probability of appearance of key point obtained by training can improve matching degree of the user's candidate word. If training data is absent, probability of appearance of key point estimated by human can also be applied. In case that there is no training, probability of each key point will be treated as 1, and the key points are exactly located on corresponding letters of the word; i.e. probability of each of P (q|quickly), P (i|quickly), P (c|quickly), P (l|quickly), P (y|quickly) is 1.

Figure 3:
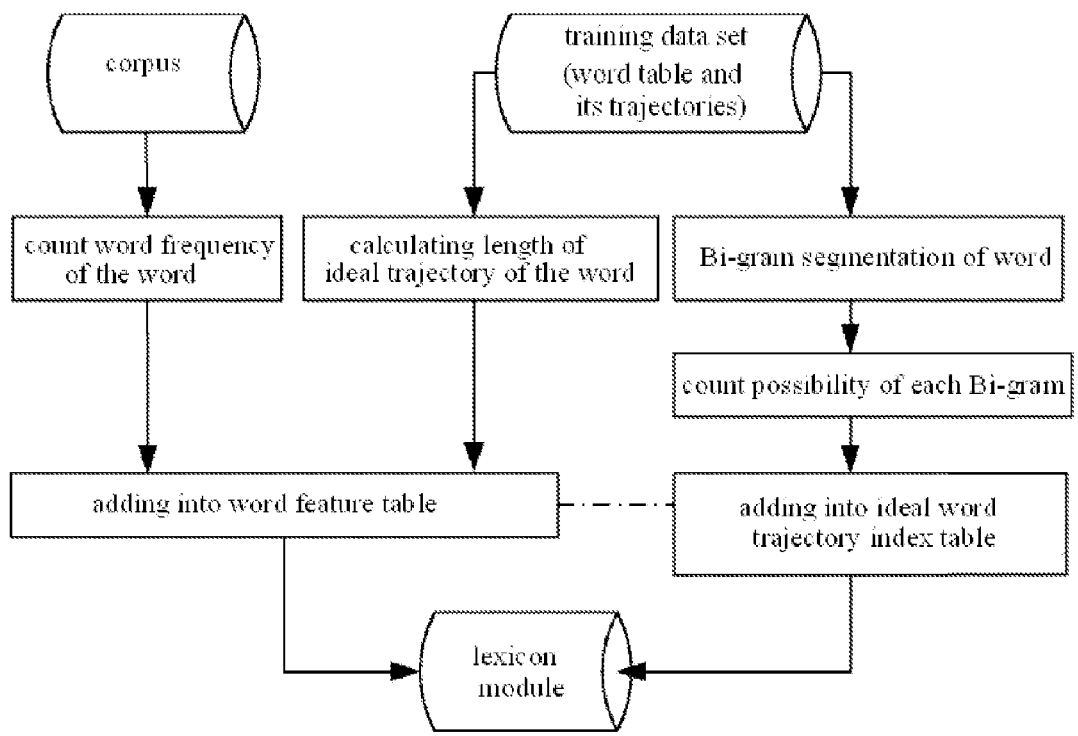
FIG. 3 is a diagram showing the process of the feature lexicon establishment processing in the method for implementing the sliding input of a text based upon an on-screen soft keyboard on an electronic equipment of the present invention.

As for feature lexicon configuring stage, as shown in FIG. 3, as described above, corresponding ideal trajectory features (mainly including trajectory length and ideal key point) with respect to any word in a dictionary are extracted and stored into a specific structure, so as to quickly calculate the candidate word. In order to satisfying the requirements of prefix matching and spell check, a K-grams inverted index structure is applied. The feature lexicon is composed of two parts of the word feature table and the ideal trajectory index table; and the index table quotes each word in the word feature table. Those two parts will be described in detail as follows.

As for ideal word trajectory index table, a concept of K-Grams model (K-GramsMODEL) will be explained first:

K-Grams is a character string subset composed of a successive character string with a length of K. Assuming that the character string is $X_1X_2 \ldots X_nX_{n-1}$, its K-Grams will respectively be $X_1X_2 \ldots X_k$, $X_2X_3 \ldots X_{k-1}$, $X_{n-k-1}X_{n-k-2} \ldots X_n$. When the length K is 2, K-Grams model becomes a special Bi-grams model. As described above, assuming that ideal key point sequence corresponding to word "quickly" is "qicly", the Bi-grams (Bi-grams) corresponding to the ideal key point sequence will be $q, qi, ic, cl, ly, and a special character $ is used for marking the start and the end.

As for Bi-grams probability corresponding to the word:

Assuming that ideal point trajectory sequence corresponding to word W is $X_1X_2 \ldots X_nX_{n-1}$, probability of corresponding key point is represented by:

$$P(X_1|W),P(X_2|W) \ldots P(X_n|W)$$

corresponding Bi-grams probability is:

$$P(X_{k-1}X_k|W)=P(X_{k-1}|W) \times P(X_k|W) \qquad 3.1$$

especially, as for the first bit:

$$P(\$X_1|W)=P(X_1|W)$$

In the following, K-grams inverted index will be described:

Inverted index is a storage structure that uses partial properties to map the whole record, and it is widely used in a field of message retrieval. Unlike the ordinary structure, inverted index determines the position of record according to the properties, thus, it is referred to as inverted arrangement.

Figure 4:
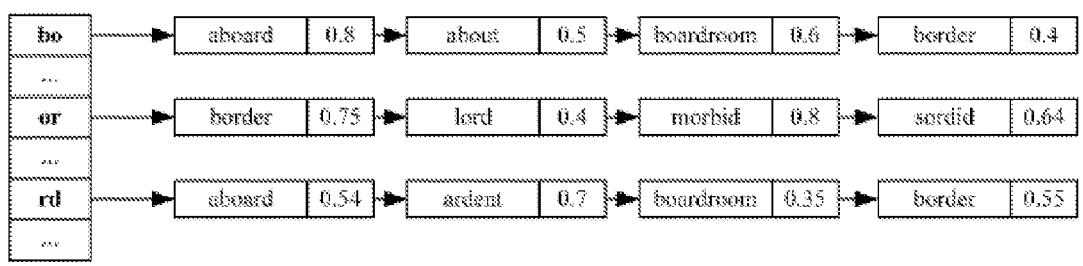
FIG. 4 is a diagram showing the Bi-grams inverted index structure during the feature lexicon establishment processing in the method for implementing the sliding input of a text based upon an on-screen soft keyboard on an electronic equipment of the present invention.

As for a certain word described in this context, its property is K-grams of the ideal key point sequence corresponding to this word, and the inverted index is established according to its K-grams. For example, as for Bi-grams inverted index of word "border" (in case of K=2), assuming that its ideal key point sequence is "border", corresponding Bi-grams are respectively $b, bo, or, rd, de, er, and the inverted index is established according to those Bi-grams. As shown in FIG. 4, "bo", as a Bi-grams key point, points to all the records that include this property (i.e. node of words that include this Bi-grams key point) and probability that this Bi-grams key point appears in individual ideal word sliding trajectory. By means of a large number of training data, according to above formula 3.1, probability of each of P(bo|aboard), P(bo|about), P(bo|boardroom), P(bo|boarder) are respectively calculated, and is stored under "bo" property in Bi-grams in form of linked table or mapping. Wherein, "bo" is a Bi-grams key point, and P(bo|aboard) is probability that Bi-grams key point "bo" appears in the ideal sliding trajectory of word "aboard". When K=3, tri-grams key points of word "aboard" are respectively $b, bor, ord, rde, der, and similarly, tri-grams inverted index can be created.

In summary, the K-Grams inverted index includes a group of mappings from individual K-Grams key point to word node of each group; and each word node includes a word identification of such word, and probability that the K-Grams key point appears in the ideal sliding trajectory of such word.

Such structure for storing an inverted index of K-grams is referred to as K-grams inverted index.

According above mentioned methods, as for any word, its ideal trajectory point sequence and corresponding Bi-grams can be extracted; and after ideal trajectory point sequence of any word is extracted, its Bi-grams inverted index is established accordingly. As shown in FIG. 4, the global ideal word trajectory index table is created.

Meanwhile, in the invention, in addition to using Bi-grams inverted index, other K-Grams, such as 3-Grams and so on, can also be used, so that storage efficiency can be further improved, and space is saved, but identified accurary may be reduced to some extent.

As for the establishment of word feature table, the features are firsly extracted:

Feature value to be used of each word is extracted according to above-mentioned methods, including word length, ideal trajectory length and word frequency. Wherein, word length is the number of characters included in such word; length of the ideal trajectory may refer to length of the ideal trajectory of the word as described above; the word frequency can be made with independent statistics, or can be obtained by a statistical analysis based on a representative corpus derived from internet.

Next, feature table is stored:

Each index in last section corresponds to one word, and each word itself and its features need to be stored in feature lexicon in advance. Herein, the lexicon may be stored in existing small-scale database, and private storage type can also be designed to improve speed of access of data and space for use.

Figure 5:
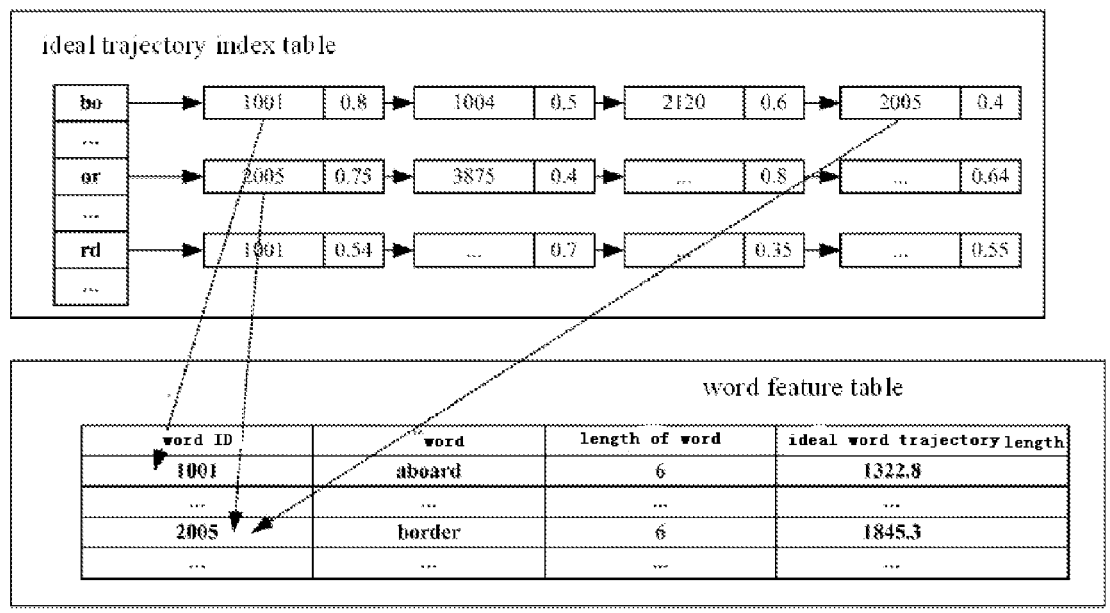
FIG. 5 is a diagram showing whole logic structure of the feature lexicon in the method for implementing the sliding input of a text based upon an on-screen soft keyboard on an electronic equipment of the present invention.

Finally, a logic structure of storage of the feature lexicon is shown in FIG. 5.

Step II:

the user interface interaction information processing operation, for processing interaction information with a user, recording user-sliding trajectories, and storing coordinate information of the user-sliding trajectory into specific data structure.

Step III:

the sliding trajectory feature extraction processing operation, for converting the user-sliding trajectories recorded by said user interface module into a user-sliding trajectory feature set to be processed, which includes the following steps:

(a) the system performs trajectory preprocessing operation on the user-sliding trajectory, which includes the following steps:

(i) performing a size normalization process on the user-sliding trajectory so as to obtain a point sequence with unified coordinate system;

(ii) performing a trajectory smoothing process on said point sequence so as to obtain a point sequence without noise caused by dithering; and the smoothing process on the trajectory is specifically as follows:

performing a smoothing process on the trajectory, so as to eliminate noise in the sliding trajectory data caused by reasons such as dithering of hands; and performing the smoothing process on the trajectory is specifically as follows:

performing a smoothing process on the trajectory by means of mean filter;

(b) the system performs key point extraction processing operation on the preprocessed user-sliding trajectory, which includes the following steps:

(i) choosing key points on the user-sliding trajectory, which includes the following steps:

(A) fetching out starting and ending points of the user-sliding trajectory as starting and ending key points;

(B) calculating a change rate of slope of each point in the point sequence of the user-sliding trajectory, and fetching out inflection points in the trajectory as ordinary key points;

calculating the change rate of slope of each point in the point sequence of the user-sliding trajectory, is specifically as follows:

calculating the change rate of slope of each point in the point sequence of the user-sliding trajectory by using second-order difference;

(ii) calculating length of the user-sliding trajectory includes the following steps:

(A) calculating distances between every two successive points according to the point sequence of the user-sliding trajectory;

(B) adding up all the distances between two successive points, so as to obtain the length of the user-sliding trajectory.

Figure 6:
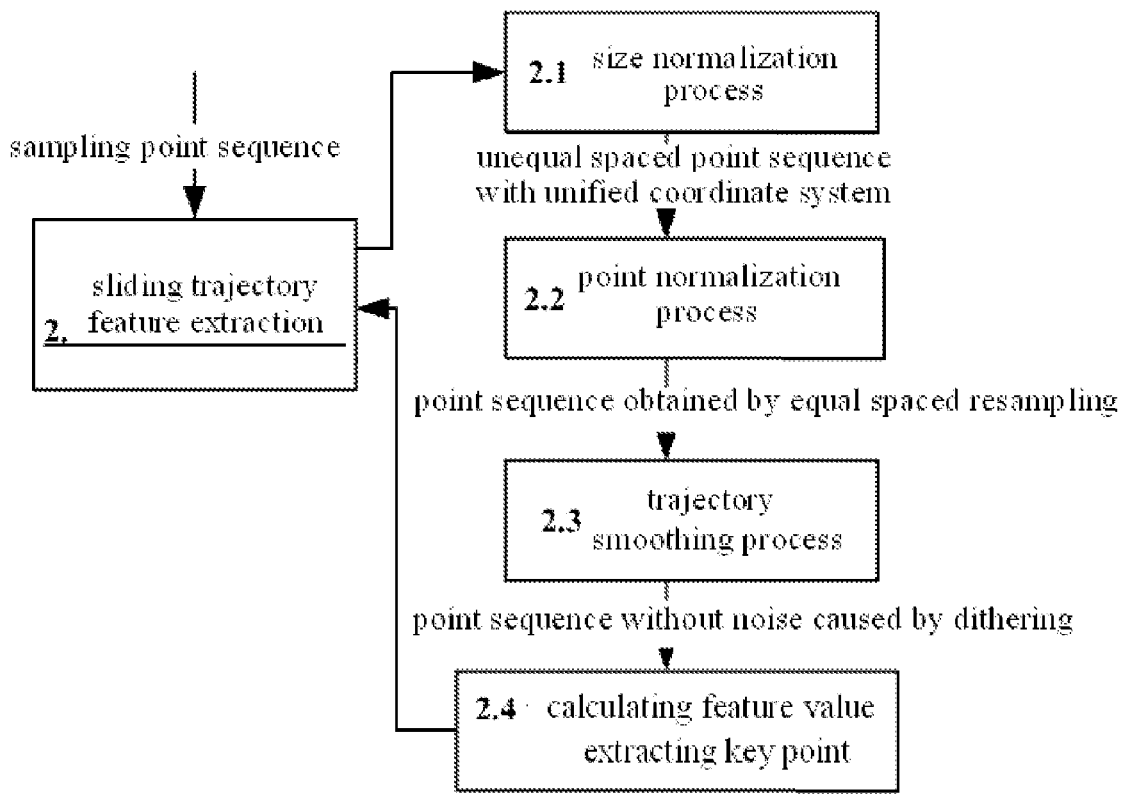
FIG. 6 is a flow chart of the trajectory feature extraction processing operation in the method for implementing the sliding input of a text based upon an on-screen soft keyboard on an electronic equipment of the present invention.

In actual applications, the extraction of trajectory sequence please refer to FIG. 6, wherein pretreatment of the trajectory is performed first.

The sliding trajectory data is a two-dimensional data set of points, whose sampling rate varies with the parameters of cell phone touch screen. Each point includes a two-dimensional data: (x, y). Wherein, "x" and "y" are respectively horizontal ordinate and longitudinal coordinates of current trajectory point.

Since reasons such as dithering of hands of the user will cause noise in the sliding trajectory data, a series of preprocessing operations on the trajectory by the present invention include size normalization, point normalization, and trajectory smoothing, which are shown in the following table:

| | |
|---|---|
| size normalization | eliminating difference of size of the trajectory caused by difference of size of cell phone touch screen |
| trajectory smoothing | smoothing the trajectory by means of mean filter, so as to eliminate noise in the sliding trajectory data caused by reasons such as dithering of hands |

Then, the next is feature extraction, and as for any sliding trajectory segment, it can be determined by the following parameters, thus, they can be treated as features.

(1) Key Point

As shown in FIG. 8, which shows the accurate sliding trajectory of word "quickly", wherein those in circle of dotted line are key points. Positions corresponding to "q", "u", "i", "c", "k", "l" and "y" on the keyboard need to be acrossed in order for the user to input word "quickly" (in case that prefix matching is not considered), and key points can be extracted from the trajectory corresponding to the word "quickly". The present invention divides key points into the following three kinds:

starting and ending key points—starting point "q" and ending point "y" are used as starting and ending points of this trajectory, and are extracted as main key points.
  ordinary key points (inflection point)—in order for the user to slide across letters "i", "c", "k", "l", the sliding trajectory of FIG. 8 shows sudden direction changes of trajectory near corresponding letters, which are inflection points.
  deserted key points—in FIG. 8, "u" being a point located on line connecting "q" and ""i, and "k" being a point located on line connecting "c" and "l", there is no obvious, abrupt change for those points on the trajectory, and thus those points are not considered as key points.

The corresponding rules are as follows:

Key point corresponding to a certain word trajectory must locate near such word, however, the converse does not hold.

As for extraction of key points, it is known from above that the key point may be equivalent to the inflection point in most cases, thus the key point in the trajectory can be extracted by calculating a change rate of slope of inflection point. As to the starting and ending key points, it is simple to extracted.

A discrete second-order difference is calculated by sliding and panning the window; i.e. for a sliding window having a certain size, average values of change rates of slopes of all points in such window are calculated. Assuming that the trajectory is comprised of six points of (1, 1), (2, 2), (3, 3), (4, 4), (4, 9), (6, 6), the change rate of slopes of points (1, 1), (2, 2), (3, 3), (4, 4) in a sliding window having size of 4 is 0, thus inflection point does not exist; the change rate of slopes of sliding window (2, 2), (3, 3), (4, 4), (4, 9) is +∞, and there is an inflection point which is (4, 4).

(2) Length of Trajectory

Considering the trajectory is not smooth, it is hard to calculate accurate length of the trajectory, preprocessed trajectory is fetched out, and distances between every two successive points are added up, so as to approximately calculate the length of trajectory; similar to concept of integration, it is easy to extract the length of each segment of the user-sliding trajectory.

Step IV:

the rough classifying and filtering processing operation, for obtaining words having similar ideal sliding trajectory feature with the user-sliding trajectory feature set by classifying and filtering in said feature lexicon module, and composing a original chosen word set, which includes the following steps:

(a) calculating a rough matching degree between words in said feature lexicon module and said user-sliding trajectory feature set; there are three kinds of such calculating process:

The first kind of calculating process includes the following steps:

(i) extracting the length of the user-sliding trajectory and a key point sequence on the user-sliding trajectory according to the user-sliding trajectory feature set;

(ii) obtaining a corresponding Bi-grams character string set according to the key point sequence on said user-sliding trajectory;

(iii) inquiring in said feature lexicon module by making individual Bi-grams character string in the Bi-grams character string set as a query condition, and fetching out probabilities of all the inquired-out Bi-grams character strings and words corresponding to each individual probability;

(iv) calculating a probability $P(C|W)$ that the user effectively wants to obtain a word C on precondition that the user inputs a sliding trajectory W according to the following formula;

$$P(C|W)=P(\$r_1|C) \times P(r_1r_2|C) \times \ldots \times P(r_{n-1}r_n|C) \times P(r_n\$|C) \times P(C);$$

Wherein $r_1r_2r_3r_4 \ldots r_n$ is the key point sequence of sliding trajectory W; $\$r_1, r_1r_2, \ldots r_{n-1}r_n, r_n\$$ are Bi-grams character strings of the key point sequence of sliding trajectory W; $P(C)$ is word frequency that the word C appears; and $\$$ is a special character for marking the start and the end;

(V) calculating a rough matching degree match_metric$P(C|W)$ between the sliding trajectory W and the word C according to the following formula:

$$\text{match\_metric}P(C|W)=\log P(\$r_1|C)+ \log P(r_1r_2|C)+\ldots+\log P(r_{n-1}r_n|C)+\log P(r_n\$|C)+ \log P(C);$$

Wherein, log represents logarithmic operation;

The second kind of calculating process includes the following steps:

(i) receiving a partial sliding trajectory V input by the user, wherein such partial sliding trajectory V is a preorder trajectory of the complete sliding trajectory W meant to be input by the user;

(ii) extracting length of the partial sliding trajectory and the key point sequence on the partial sliding trajectory according to said partial sliding trajectory V;

(iii) obtaining corresponding Bi-grams character string set according to the key point sequence on said partial sliding trajectory;

(iv) making individual Bi-grams character strings in the Bi-grams character string set as query conditions so as to inquire in said feature lexicon module, and fetching out probabilities of all the inquired-out Bi-grams character string and words corresponding to each individual probability;

(v) calculating a probability $P(C|W)$ that the user effectively expects a word C while inputting a partial sliding trajectory V according to the following formula:

$$P(C|V)=P(\$r_1|C) \times P(r_1r_2|C) \times \ldots \times P(r_{k-1}r_k|C) \times P(r_k\$|C) \times P(C);$$

Wherein, $r_1r_2r_3r_4 \ldots r_n$ is the key point sequence of the complete sliding trajectory W; $r_1r_2r_3r_4 \ldots r_k$ is the key point sequence of the partial sliding trajectory V, with $k \leq n$; and $\$r_1, r_1r_2, \ldots r_{k-1}r_k, r_k\$$ is a Bi-grams character string of the key point sequence of the partial sliding trajectory V; $P(C)$ is word frequency that the word C appears; and $\$$ is a special character for marking the start and the end;

(vi) calculating the rough matching degree match_metricP (C|V) between the partial sliding trajectory V and the word C according to the following formula:

$$\log P(\$r_1|C)+\log P(r_1r_2|C)+\ldots+\log P(r_{k-1}r_k|C)+\log P(r_k\$|C)+\log P(C);$$

Wherein, log represents logarithmic operation;

(vii) taking the rough matching degree match_metricP (C|V) between the partial sliding trajectory V and the word C as the rough matching degree match_metricP (C|W) between the complete sliding trajectory W and the word C.

The third kind of calculating process includes the following steps:

(i) the system sets initially a former partial sliding trajectory segment V as 0, and sets the rough matching degree match_metricP (C|V) between the former partial sliding trajectory segment V and the word C as log P (C), wherein, P (C) is word frequency that the word C appears;

(ii) the system detects that a staying time of the user on a certain point of the sliding trajectory exceeds a staying time threshold preseted by the system;

(iii) the system receives the whole sliding trajectory W input by the user up to the current sliding-stop-and-staying;

(iv) obtaining present sliding trajectory segment S according to the following formula, and extracting length of the present sliding trajectory segment S and the key point sequence on the present sliding trajectory segment S:

$$S=W-V;$$

(v) obtaining corresponding Bi-grams character string set according to the key point sequence on said present sliding trajectory segment S;

(vi) taking individual Bi-grams character strings in the Bi-grams character string set as query conditions in order to inquire in said feature lexicon module, and fetching out probabilities of all the inquired-out Bi-grams character strings and words corresponding to each individual probability;

(vii) calculating an incremental rough matching degree match_metricP (C|S) between the present sliding trajectory segment S and the word C according to the following formula:

$$\text{match\_metric}P(C|S)=\log P(\$r_k|C)+\log P(r_kr_{k-1}|C)+\ldots+\log P(r_{n-1}r_n|C+\log P(r_n\$|C);$$

wherein, log represents logarithmic operation; $r_kr_{k+1}\ldots r_n$ is the key point sequence of the present sliding trajectory segment S; $\$r_k, r_kr_{k+1}r_n \ldots$ ir$_n$, $r_n\$$ are Bi-grams character strings of the key point sequence of the present sliding trajectory segment S; and $ is a special character for marking the start and the end;

(viii) calculating the rough matching degree match_metricP (C|W) between the whole sliding trajectory W and the word C according to the following formula:

$$\text{match\_metric}P(C|W)=\text{match\_metric}P(C|V)+\text{match\_metric}P(C|S);$$

(ix) setting former sliding partial trajectory segment V as the whole sliding trajectory W, and setting the rough matching degree match_metricP (C|V) between the former partial sliding trajectory segment V and the word C as the rough matching degree match_metricP (C|W) between the whole sliding trajectory W and the word C;

(x) taking the rough matching degree match_metricP (C|W) between the whole sliding trajectory W and the word C as the rough matching degree match_metricP (C|T) between the complete sliding trajectory T and the word C.

(b) if the rough matching degree is greater than the rough matching degree threshold preseted by the system, adding corresponding word into said original chosen word set;

(c) returning to above step (a), until every word in the feature lexicon module has been traversed.

In actual applications, by using algorithms of rough classifying and filtering, a candidate word set having high matching degree is quickly picked out from a feature lexicon of the user-sliding trajectory according to the feature lexicon of the user-sliding trajectory. In the present invention, a rough matching degree is calculated for each word in the lexicon, and then a set of the candidate words in which each word has a rough matching degree greater than a certain rough matching degree threshold match_threshold1, is output to next stage of rough matching and filtering.

The theoretical basis for the candidate word matching is as follows: Assuming "W" is a sliding trajectory of a word input by the user, C is a candidate word in word table, P (W) is probability that the user inputs such sliding trajectory W, P (C) is word frequency that the candidate word C appears, and the specific value is obtained during feature lexicon configuring stage by statistics.

P (C|W) is a probability that the user effectively wants to obtain a word C on precondition that the user inputs a sliding trajectory W, that's to say, calculating to find out a word $c_{max}$ in the word table that makes P (C|W) maximal in case that the user inputs trajectory of W.

When the user finishes sliding trajectory W of a certain word, as for the calculation of P (C|W), probability P (W) of the trajectory is a fixed value; as shown in FIG. 9, W corresponds to trajectory W (qicly), and values of P (C|W (qicly)) of all words are calculated so as to find out corresponding word $C_{max}$ that makes P(C|W(qicly)) maximal; and the desired result is that P($C_{quicldy}$|W) become maximal when $C_{max}$=quickly.

Since P (W) is a fixed value, and it does not change after the user inputs the trajectory.

As for Bi-grams model:

$$P(C|W)=P(r_1r_2|C)\times\ldots\times P(r_{n-1}r_n|C)\times P(C) \qquad 4.1$$

Since approximation is assumed, word $C_{max}$ that makes P(C|W) maximal obtained by calculation of $P(r_1r_2|C)\times\ldots\times P(r_{n-1}r_n|C)\times P(C)$ is probably not what the user really desired, therefore, first K words whose value are greatest need to be calculated, and then an accurate matching process is performed.

Regarding rough classifying and filtering of the present invention, a first kind of calculation is as follows:

As for a certain segment of trajectory W input by the user, actual length of the trajectory and actual key point sequence of the word constituted of corresponding feature point set are extracted; assuming that the actual key point sequence of W is $r_1r_2r_3r_4\ldots r_n$ and its corresponding Bi-grams are respectively $\$r_1$, rir$_2$, $\ldots r_{k-1}r_k$, query conditions are composed so as to inquire global word trajectory index table, and words corresponding to all the searched out Bi-grams and its probabilities are respectively fetched out, so that a score can be calculated.

It is known form above formula 4.1 that, $$P(C|W)=P(r_1r_2|C)\times\ldots\times P(r_{n-1}r_n|C)\times P(C)$$

Wherein, after performing logarithmic operation on all the searched out Bi-grams $r_{k-1}r_k$, we can get:

$$\text{match\_metric}P(C|W)=\log P(\$r_1|C)+\log P(r_1r_2|C)+\ldots+\log P(r_{n-1}r_n|C)+\log P(C) \qquad 4.2$$

As shown in FIG. 4, key points of trajectory in corresponding figure are "q", "i", "v", "l", "y", and their Bi-grams are respectively $q, qi, iv, vl, ly, y$; word in desirable situation should be quickly. Bi-grams corresponding to the ideal trajectory sequence composed of "qivly" constitute the query conditions, for inquiring in global word trajectory index table.

In order to calculate, match_metric(quickly|$P_{qivly}$) probabilities of word "quickly" under Bi-grams $q,qi,iv,vl,ly correspondingly, P ($q|quickly), P (qi|quickly), . . . , P (ly|quickly) are respectively fetched out, and are substituted into above formula 4.1:

match_metric(quickly|$P_{qivly}$)=
  log$P$(quickly|$P_{qivly}$)=log($P$($q|quickly))+log$P$
  ($qi$|quickly)+. . . +log$P$($ly$|quickly)

A second kind of calculation is prefix matching:
It is known from above formula 4.2 that:

match_metric$P(C|W)$=log$P$($\$r_1|C$)+
  log$P(r_1r_2|C)$+. . . +log$P(r_{n-1}r_n|C)$+log$P(r_n\$|C)$+
  log$P(C)$ Wherein, W is a trajectory completely input by the user; the actual key point sequence is labeled as $r_1r_2r_3r_4 \ldots r_n$, and its corresponding Bi-grams are respectively $\$r_1$, $r_1r_2$, . . . , $r_{k-1}r_k$; assuming that V is partial trajectory input by the user, belonging to a prefix of W, the actual key point sequence is labeled as:

$$r_1r_2r_3r_4 \ldots r_k (k<n)$$

A corresponding matching degree score match_metric of the new trajectory V of prefix portion is:

match_metric$P(C|V)$=log$P$($\$r_1|C$)+
  log$P(r_1r_2|C)$+. . . +log$P(r_{k-1}r_k|C)$+log$P(r_k\$|C)$+
  log$P(C)$    4.3

By comparing above formulae 4.2 and 4.3, it is easy to find out that first K items of those formulae are the same. When n-k is not big, P (C|V) is considered to be able to reflect P (C|W), therefore partial preorder trajectory can be used to replace the whole trajectory during calculation.

A third kind of calculation is incremental calculation with respect to forecasting-between-slidings function:

In order to support forecasting-between-slidings function (i.e. pumping out words when the user stops sliding), better real-time properties are required. In order to fulfill the requirements of real-time calculation and to reduce the cost on calculation, the system applies a form of incremental calculation.

The trigger conditions of the forecasting-between-slidings are as follows:

When a staying time of the user on a certain key exceeds threshold, the system automatically calculates the sliding input result of the user at this time.

As for the sliding trajectory V produced when the user stays for the first time, the actual key point sequence is labeled as $rir_2r_3r_4 \ldots r_k$, the original calculation flow is applied, and intermediate result P (C|V) of word calculation is used as base of next incremental inquiry.

As for sliding trajectory W produced while the user is making sliding, the actual key point sequence is labeled as $r_1r_2r_3r_4 \ldots r_n$ (n≥k), it's easy to know that trajectory V is a part of trajectory W; here, W is called as incremental trajectory of V. According to above description related to Bi-grams model, Bi-grams produced by trajectory V is also a subset of Bi-grams of trajectory W. According to above formula 4.2:

match_metric$P(C|V)$ =
  log$P$($\$r_1 | C$) + log$P(r_1r_2 | C)$ + ... + log$P(r_{k-1}r_k | C)$ + log$P(C)$;

match_metric$P(C|W)$ =
  log$P$($\$r_1 | C$) + log$P(r_1r_2 | C)$ + ... + log$P(r_{n-1}r_n | C)$ + log$P(C)$ =
  log$P(V | C)$ + log$P(C)$ + log$P(r_kr_{k+1} | C)$ + ... + log$P(r_{n-1}r_n | C)$;

Therefore, in order to calculate matching degree match_metricP (C|W) of incremental trajectory W of V, it's only have to calculate the actual key point sequence $r_k \ldots r_n$ (n≥k) of incremental trajectory, and corresponding Bi-grams matching degree is labeled as $r_kr_{k-1}, \ldots r_{n-1}r_n$, incremental sequence matching degree is calculated as follows:

match—metric$P(C|(W-V)$=log$P(r_kr_{k-1}|C$+. . . +log$P$
  $(r_{n-1}r_n|C)$;

The total between-slidings trajectory is as follows:

match—metric$P(C|W)$=match—metric$P(C|(W-V))$+
  match—metric$P(C|V)$;

Therefore, as for incremental trajectory, it's only have to calculate incremental portion, and the total computation cost is only equivalent to a complete and one-time calculation of matching degree of P (C|W).

Figure 10:
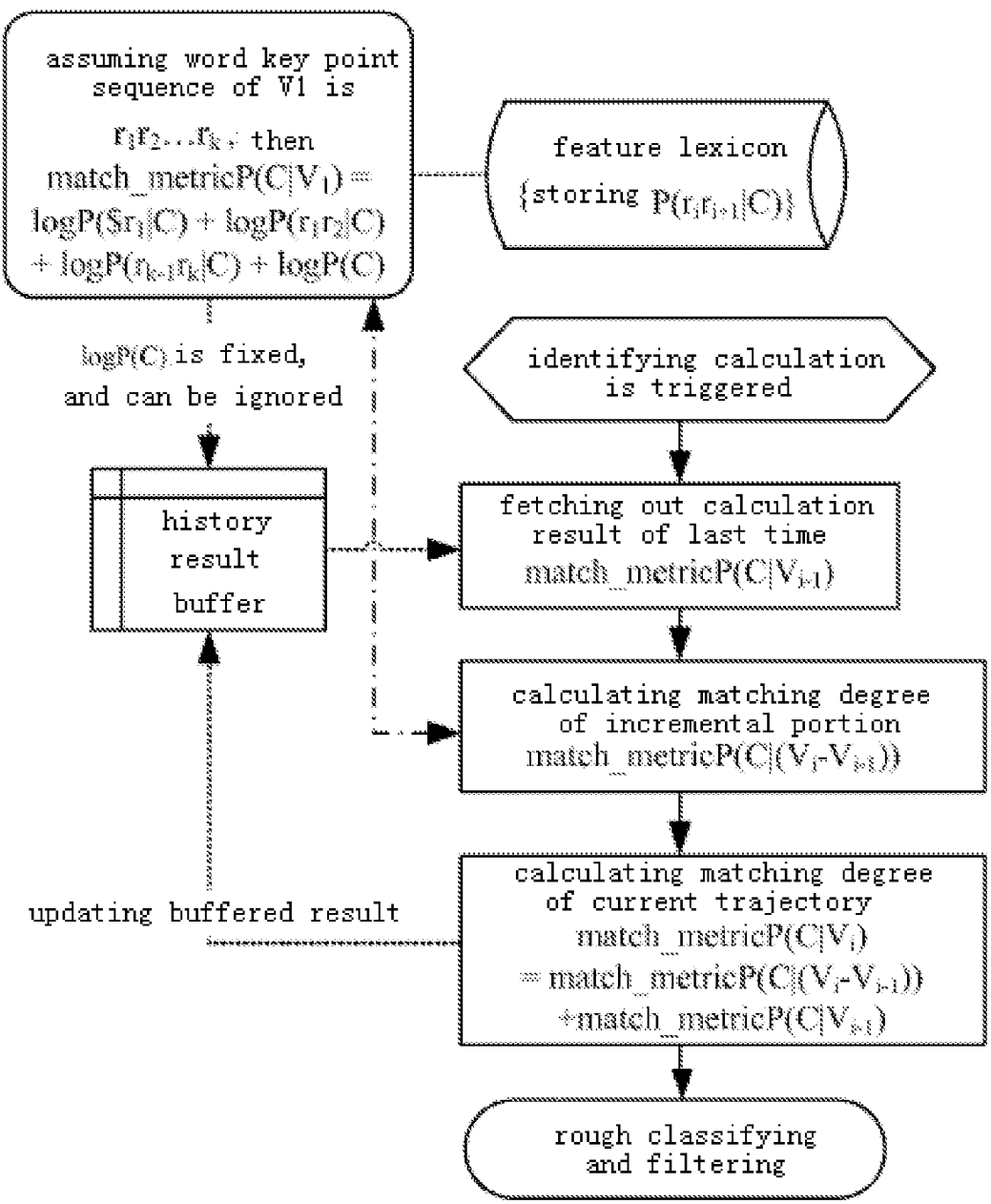
FIG. 10 is a flow chart for implementing incremental calculation of forecasting-between-slidings function in the rough classifying and filtering process of the method for implementing the sliding input of a text based upon an on-screen soft keyboard on an electronic equipment of the present invention.

Again, as shown in FIG. 10, result of first forecasting-between-slidings is used as input of next forecasting-between-slidings, so as to calculate a new incremental trajectory matching degree; and such structure uses previous calculating results, thus time cost on calculation is enormously reduced, and forecasting-between-slidings function gets better support.

As for the output procedure of the candidate word: As for each word in the feature lexicon, the present invention can calculate its matching degree match_metric according to above algorithm. If the matching degree is greater than a threshold match threshold1, the present invention will add it into an output candidate word set, so as to output it to next rough matching and filtering stage.

Step V:

the rough matching and filtering processing operation for using a key point feature to calculate a similarity between the ideal sliding trajectory feature of each word in the original chosen word set and said user-sliding trajectory feature set, obtaining a follow-up chosen word set by sorting according to the similarity as well as matching and filtering, and feedbacking the follow-up chosen word set as the candidate result of words to said user interface module.

Such calculating a similarity between the ideal sliding trajectory feature of each word in the original chosen word set and said user-sliding trajectory feature set, sorting as well as matching and filtering, and feedbacking as the candidate result of words to said user interface module, includes the following steps:

(a) calculating a linear matching distance between the ideal trajectory of each word in said original chosen word set and said user-sliding trajectory feature set; which includes the following steps:
  (i) extracting ideal word key point sequence according to ideal trajectory of words, and extracting the key point sequence on the user-sliding trajectory according to said user-sliding trajectory feature set;
  (ii) calculating a matched distance match_metric between a first key point $r_1$ in the key point sequence on the user-sliding trajectory and a first key point $u_1$ in the ideal word key point sequence, according to the following formula:

match_metric=distance($r_1,u_1$)×$w[r_1]$;

Wherein, distance (p, q) is a distance between a point p and a point q; w[$r_1$] is a weight of the key point $r_1$;

(iii) determining whether or not distance distance($r_i$, $u_j$) between next key point $r_i$ in the key point sequence on the user-sliding trajectory and the first key point $u_j$ in the ideal word key point sequence is smaller than the matched distance threshold;

(iv) if so, calculating a matched distance match_metric according to the following formula:

match_metric=match_metric+distance($r_i$,$u_j$)×w[$r_i$];

wherein, W[$r_i$] is a weight of the key point $r_i$;

moreover, individually increasing i and j by 1 and then proceeding to step (vi);

(v) if not, recording the distance distance($r_i$, $u_j$) unmatched key point set;

(vi) determining whether or not all key points in the key point sequence on said user-sliding trajectory have been traversed or all key points in ideal word key point sequence have been traversed;

(vii) if not, returning to above step (iii);

(viii) if so, determining whether or not said unmatched key point set is empty;

(ix) if not, calculating a matched distance match_metric according to the following formula:

match_metric=match_metric+$\Sigma_{d_i \in S}$($d_i$*w[$r_i$]);

wherein, $d_i$=distance($r_i$, $u_j$), and S is an unmatched key point set;

(x) determining whether the traversed items are all key points in the key point sequence on the user-sliding trajectory or all key points in the ideal word key point sequence;

(xi) if the traversed items are all key points in the key point sequence on the user-sliding trajectory, calculating a matched distance match_metric according to the following formula:

match_metric=match_metric+$\Sigma_{k=j}^{n}$($c_k$*w[$u_k$]);

wherein, $u_k$ are key points of ideal word key point sequence that have not been traversed, k=j, j+1, ..., n, with n being the total number of key points in the ideal word key point sequence; $c_k$ is the shortest distance from key point $u_k$ to the user-sliding trajectory;

(xii) if the traversed items are all key points in the ideal word key point sequence, calculating a matched distance match_metric according to the following formula:

match_metric=match_metric+$\Sigma_{k=i}^{m}$($c_k$*w[$r_k$]);

wherein, $r_k$ are key points of the key point sequence on the user-sliding trajectory that have not been traversed, k=i, i+1, m, with m being the total number of key points in the key point sequence on the user-sliding trajectory, $c_k$ is the shortest distance from key point $r_k$ to the ideal trajectory of the word;

(xiii) taking said matched distance match_metric as the linear matching distance between the ideal trajectory of the word and said user-sliding trajectory feature set.

Said distance is Euclidean distance;

In order to realize and support forecasting-between-slidings function (i.e. pumping out words when the user stops sliding), the following steps may be performed before above step (a):

(a0) performing trajectory segmentation on the ideal trajectory of the word in the original chosen word set according to said user-sliding trajectory feature set, which includes the following steps:

(ai) extracting ideal word key point sequence according to the ideal trajectory of the word, and according to said user-sliding trajectory feature set, extracting length of the user-sliding trajectory and the key point sequence on the user-sliding trajectory;

(aii) calculating a path length PathLen[i] of each ideal key point $C_i$ on the ideal trajectory of the word according to the following formula:

PathLen[i]=PathLen[i−1]+distance($C_{i-1}$,$C_i$);

Wherein, i=2, 3, ..., n, with n being the total number of ideal word key points; PathLen[1]=0; distance ($C_{i-1}$, $C_i$) is a distance between ideal word key point $C_{i-1}$ and $C_i$;

(aiii) determining respectively whether the length PathLen$_R$ of said user-sliding trajectory satisfies the following relations:

|PathLen$_R$−PathLen[i]|≤$T_{len\_diff}$;

Wherein, i=2, 3, ..., n; and $T_{len\_diff}$ is trajectory segmentation length threshold preseted by the system; the trajectory segmentation length threshold $T_{len\_diff}$ is obtained by a large number of training data;

(aiv) if they are satisfied, adding the ideal word key point $C_i$ into the segmentation point candidate set;

(av) repeating above steps (iii) to (iv), until all ideal word key points of the ideal word key point sequence have been traversed;

(avi) determining respectively whether individual ideal word key point $C_i$ in said segmentation point candidate set satisfies the following relations:

distance($P_{end}$,$C_j$)<$T_{dis\_diff}$;

wherein, i=2, 3, ..., n; $P_{end}$ is the last key point of the key point sequence on the user-sliding trajectory; $T_{dis\_diff}$ is a trajectory segmentation distance threshold preseted by the system; the trajectory segmentation distance threshold $T_{dis\_diff}$ is obtained by a large number of training data;

(avii) if they are satisfied, segmenting said ideal trajectory of the word according to the ideal word key point, and adding a trajectory segment from the start point of the ideal trajectory of the word to the ideal word key point $C_i$, as the ideal word sub-trajectory, into the segmented ideal word sub-trajectory set;

(aviii) repeating above steps (avi) to (avii), until all ideal word key points in the segmentation point candidate set have been traversed;

After trajectory segmentation is performed, said calculating the linear matching distance between ideal trajectory of words in said original chosen word set and said user-sliding trajectory feature set, is specifically as follows:

respectively taking individual ideal word sub-trajectory in said segmented ideal word sub-trajectory set as the ideal trajectory of the word, performing above steps (i) to (xii), and choosing the smallest matched distance among the calculated individual matched distances match_metric, as the linear matching distance between the ideal trajectory of the word and said user-sliding trajectory feature set.

(b) if the linear matching distance is smaller than the linear matching distance threshold preseted by the system, adding corresponding word into said follow-up chosen word set;

(c) returning to above step (a), until every word in the original chosen word set has been traversed.

In actual applications, as for rough matching and filtering module, a set of possible words is obtained after previous rough classifying and is used as the candidate word set, and ideal trajectory of each candidate word in such set is extracted out to make rough matching with a trajectory input by the user, and a matched distance value is obtained. The rough matching procedure is an incremental algorithm. When the trajectory input by the user produces an inflection point, or when staying time that the user stay on a position exceeds a value, or when the user finishes the input of trajectory and lifes the hand, the present invention begins to start the rough matching so as to produce the candidate word for subsequent accurate matching.

The algorithms of rough matching are as follows:

The core idea of rough matching method is to compare key points on the trajectory input by the user and that on the ideal trajectory of the candidate word. As for key points on the candidate word ideal trajectory, the present invention uses them to make linear matching with key points extracted from the trajectory input by the user. When an Euclidean distance between two points is smaller than a threshold distancethreshold, the matched distance the Euclidean distance between two points multiplied by a weight of such key point. Different key points on the trajectory have different weights, which can be obtained by training in the present invention. Due to reasons such as the path being incomplete, as for unmatched key point, the present invention assigns its matched distance with a value of a penalized distance multiplied by a weight of such key point. As for the deserted key point on the candidate word ideal trajectory, the present invention match it with the trajectory input by the user, and the matched distance is nearest distance from deserted key points to the trajectory input by the user multiplied by a weight of the deserted key points. Different deserted key points on the trajectory also have different weights which can also be obtained by training in the present invention. Provided that the number of key points on the trajectory input by the user is n, those key points are r1, r2, r3, r4, ..., rn, and corresponding weights are w[r_i]; the number of key points on the ideal trajectory of candidate word is m, those key points are u1, u2, u3, u4, ..., um, and corresponding weights are w[u_i]; the matched distance is match_metric. The specific matching algorithm is in fact a linear greedy algorithm, which can be performed by the following steps but is not limited to the following steps:

(1) first of all, the first key point on the trajectory input by the user, must be matched with the first point of the candidate word ideal trajectory 所 匹 配, i.e. match_metric=distance(r1, u1)×w[r1]. Wherein, distance (p, q) is Euclidean distance between two-dimensional points p and q.

(2) the next key point to be matched on the trajectory input by the user is r_i, the next key point to be matched on the candidate word ideal trajectory is u_j, wherein 1≤i≤m, 1≤j≤n. If di=distance(ri, uj)<distancethreshold, match_metric+=distance (ri, uj)×W[ri,]; then, i, j are both increased by 1; or, di is recorded in unmatched key point set S, and i is increased by 1.

(3) repeating last step until i becomes m+1 or until j becomes n+1. At this time, if unmatched key point set S is not empty, then:

match_metric=match_metric+$\Sigma_{d_i \in S}(d_i * w[r_i])$;

(4) If i≤m, then:

match_metric=match_metric+$\Sigma_{k=i}^{m}(c_k * w[r_k])$;

Wherein, c_k is the nearest distance from r_i to the candidate word ideal trajectory. If j≤n, then:

match_metric=match_metric+$\Sigma_{k=j}^{n}(c_k * w[u_k])$;

Wherein, c_k is the nearest distance from u_i to the trajectory input by the user.

In order to support a function of using incomplete trajectory to predict a complete word, the present invention only need to calculate a desired ending character of the word to be matched in order to apply above algorithm to operate. Thus, what is critical here is how to find out on which intermediate character the trajectory will end. In the following, steps of the trajectory segmentation algorithm applied by the invention will be described in detail.

In order to further improve the algorithm of the present invention, the following trajectory segmentation algorithm can be applied:

As described above, as shown in FIG. 11, dotted lines "............" and solid lines show ideal word trajectory of the word "quickly", and long broken lines "-------" shows the actual sliding trajectory (when "quickly" is input, the sliding action stops when "k" has been reached and then it is at a standstill, and a result of "quickly" is desired). A problem to be solved by such algorithm is to segment the ideal trajectory of the word into a first half portion and a latter half portion (a black solid line and a black broken line), and to perform above matching process on features on the trajectory (the black solid line) of the first half portion or the trajectory itself and the actual sliding trajectory (red solid line is matched with the black solid line). The critical aspect is to solve the problem of how to find out a segmentation point ("k" in the figure).

Assuming that the candidate word set searched out in the fourth section is Candidate Words ($W_1, W_2, \ldots W_i, \ldots, W_N$), as for each candidate word Wi, algorithm steps are as follows:

(1) assuming that $W_i$ is composed of n characters, which represented by $W_i(C_1, C_2, \ldots, C_i, \ldots, C_n)$. Paths are calculated at the time that each $W_i$ is passed by, and are stored into PathLen[i], i.e. PathLen[i]=PathLen[i−1]+distance ($C_{i-1}$, $C_i$), with i=2, 3, ..., n.

(2) assuming that the length of the actual sliding trajectory is $PathLen_R$, with respect to a given threshold $T_{len\_diff}$ as for i=1, ..., n, if:

|PathLen$_R$−PathLen[$i$]|≤$T_{len\_diff}$;

then, $C_i$ is added into a candidate set C_Set which will be processed in step 3. In the end, C_Set having a size of m will be obtained, and m is usually no more than 3. wherein, $T_{len\_diff}$ it can be obtained by training.

(3) assuming that the last point of the actual sliding trajectory is $P_{end}$, end, as for character $C_j$(j=1, 2, ..., m) in each C_Set, assuming that $P(C_j)$ is a coordinate corresponding to $C_j$. Moreover, as for a given threshold $T_{dis\_diff}$, if distance ($P_{end}, P_{Cj}$)<$T_{dis\_diff}$, then $C_j$ is the point needed to be found. wherein, $T_{dis\_diff}$ can be obtained by training.

1 to 3 possible segmentation points may be found out in above algorithm. Each point is treated as ending character of word, and matching process are performed, and then the smallest match_metric can simply be extracted.

As for the candidate word output:

With respect to each candidate word in the input set, the present invention can calculate its matching degree match_metric according to above algorithm. If the matched distance is smaller than a threshold match_threshold2, the present invention will add it into the output candidate word set, and it can be used as the candidate result of words to be feedback to said user interface module.

Meanwhile, in order to obtain higher accuracy rate of recognition, the output candidate word set can be further output to subsequent accurate matching and sorting stage.

Step VI:

the accurate matching and sorting operation, for accurately calculating an accurate similarity between the ideal sliding trajectory feature of each word in the follow-up chosen word set and said user-sliding trajectory feature set, obtaining the candidate result of words by sorting according to the accurate similarity, word frequency and user input history information, and feedbacking the candidate result of words to said user interface module. Said accurately calculating an accurate similarity between the ideal sliding trajectory feature of each word in the follow-up chosen word set and said user-sliding trajectory feature set includes the following steps:

(a) as for the ideal sliding trajectory feature of each word in said follow-up chosen word set, obtaining corresponding ideal trajectory point sequence;

(b) with respect to said user-sliding trajectory, obtaining the user-trajectory point sequence;

(c) calculating a similar distance between the ideal sliding trajectory of each word and the user-sliding trajectory according to said ideal trajectory point sequence and the user-trajectory point sequence; which includes the following steps:

(i) as for each point S[i] in said user-trajectory point sequence, suming up distances between all points t[j] in ideal trajectory point sequence and the point S[i] so as to obtain the similar distance DTW[i, j] according to the following formula:

DTW[i, j]=cost+min (DTW[i−1, j], DTW[i, j−1] and DTW[i−1, j−1]);

wherein, cost=distance(s[i], t[j]); distance (s[i], t[j]) is a distance between point s[i] and point t[j]; DTW[0, 0]=0, i=1, 2, 3, . . . , n, with n being the total number of points in the user-trajectory sampling point sequence; j=1, 2, 3, m, with m being the total number of points in ideal trajectory point sequence; min (DTW[i−1, j], DTW[i, j−1], DTW[i−1, j−1]) is a minimum value among DTW[i−1, j], DTW[i, j−1] and DTW[i−1, j−1];

(ii) repeating above step (i), until all points in said ideal trajectory point sequence have been traversed, and obtaining a summed similar distance DTW[n, m] between the ideal sliding trajectory and the user-sliding trajectory;

(d) taking said similar distance as the accurate similarity between the ideal sliding trajectory feature of this word and the user-sliding trajectory feature set.

In order to realize and support forecasting-between-slidings function (i.e. pumping out words when the user stops sliding), the following steps may be performed before above step (a):

(a0) performing trajectory segmentation on the ideal trajectory of the word in the follow-up chosen word set according to said user-sliding trajectory feature set, which includes the following steps:

(ai) extracting the ideal word key point sequence according to the ideal trajectory of the word, and extracting length of the user-sliding trajectory and the key point sequence on the user-sliding trajectory according to said user-sliding trajectory feature set;

(aii) calculating a path length PathLen[i] of each ideal word key point $C_i$ on the ideal trajectory of the word according to the following formula:

PathLen[i]=PathLen[i−1]+distance($C_{i-1}$, $C_i$);

wherein, i=2, 3, . . . , n, with n being the total number of ideal word key points; PathLen[1]=0; distance($C_{i-1}$, $C_i$) is distance between ideal word key points $C_{i-1}$ and $C_i$;

(aiii) determining respectively whether ength $PathLen_R$ of said user-sliding trajectory satisfies the following relations:

|$PathLen_R$−PathLen[i]|≤$T_{len\_diff}$;

wherein, i=2, 3, . . . , n, $T_{len\_diff}$ is trajectory segmentation length threshold preseted by the system; the trajectory segmentation length threshold $T_{len\_diff}$ is obtained by a large number of training data;

(avi) if they are satisfied, adding ideal word key point $C_i$ into the segmentation point candidate set;

(av) repeating above steps (aiii) to (avi), until all ideal word key points in the ideal word key point sequence have been traversed;

(avi) determining respectively whether individual ideal word key point $C_i$ in said segmentation point candidate set satisfies the following relations:

distance($P_{end}$, $C_j$)<$T_{dis\_diff}$;

wherein, i=2, 3, . . . , n; $P_{end}$ is the last key point in the key point sequence on the user-sliding trajectory, $T_{dis\_diff}$ is trajectory segmentation distance threshold preseted by the system; the trajectory segmentation distance threshold $T_{len\_diff}$ is obtained by a large number of training data;

(avii) if they are satisfied, segmenting said ideal trajectory of the word according to the ideal word key point, and adding a trajectory segment from the start point of the ideal trajectory of the word to the ideal word key point $C_i$, as the ideal word sub-trajectory, into the segmented ideal word sub-trajectory set;

(aviii) repeating above steps (avi) to (avii), until all ideal word key points in the segmentation point candidate set have been traversed.

In case that the trajectory segmentation process is performed, said calculating a similar distance between the ideal sliding trajectory of each word and the user-sliding trajectory according to said ideal trajectory point sequence and the user-trajectory point sequence, is specifically as follows:

taking individual ideal word sub-trajectory in said segmented ideal word sub-trajectory set as the ideal trajectory of the word one by one to perform above steps (i) to (ii), and choosing the smallest similar distance among all the calculated individual similar distance DTW[n, m], as the similar distance between the ideal sliding trajectory of the word and the user-sliding trajectory.

Said obtaining the candidate result of words by sorting according to the accurate similarity, word frequency and user input history information includes the following steps:

(a) calculating accurate matching distance match_metric1 between each word in the follow-up chosen word set and the user-sliding trajectory feature set according to the following formula:

$$\text{match\_metric1} = DTW[n, m] * \left(\left(1 + \frac{\text{real\_path\_len}}{\text{ideal\_path\_len} - 1}\right) * a\right) * \left(1 + \log\left(\frac{1}{\text{word\_freq}}\right) * b\right) * \left(1 + \left(1 - \frac{\text{word\_len}}{\text{matched word len}}\right) * c\right)$$

wherein, real_path_len is length of the user-sliding trajectory; ideal_path_len is length of ideal trajectory of the word prefix; word_freq is word frequency of the word prefix; word_len is the number of characters that constitute the word prefix; matched_word_len is the number of characters that constitute word; a, b, c are respectively weight adjusting factors; the weight adjusting factor a, b, c are all obtained by a large number of training data;

(b) sorting by magnitude all the accurate matching distances match_metric1;

(c) choosing a word corresponding to the smallest accurate matching distance match_metric1 according to the number of candidate words preseted by the system, as the candidate result of words.

Figure 12:
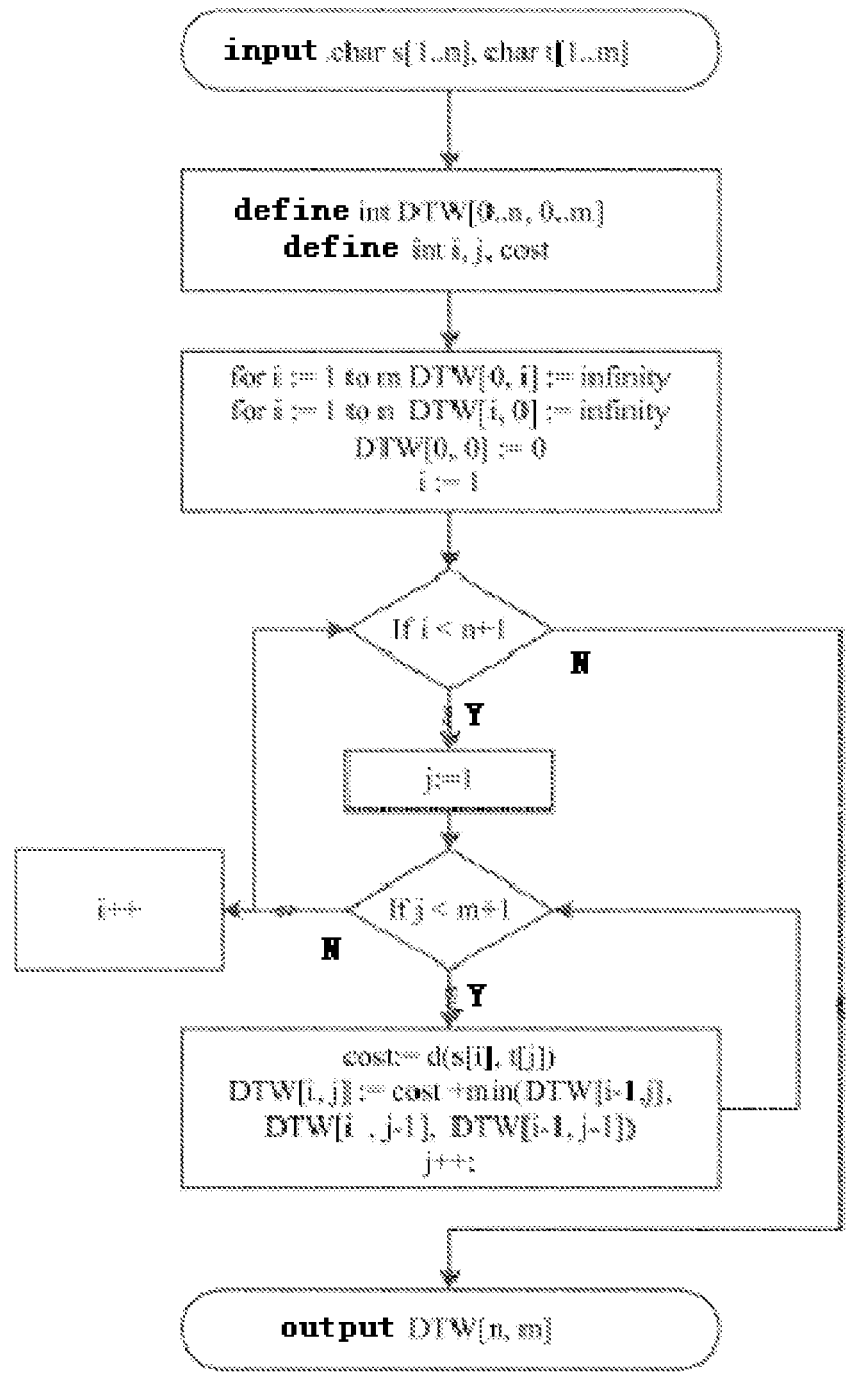
FIG. 12 is a flow chart of calculating the similar distance between the ideal sliding trajectory of the word and the user-sliding trajectory in the accurate matching and sorting process of the method for implementing the sliding input of a text based upon an on-screen soft keyboard on an electronic equipment of the present invention.

In actual applications, the procedure of accurate matching and sorting is specifically as follows: Point sequences of two trajectories are obtained, with respect to the ideal trajectory of each word in the candidate word set obtain in last step and the actual sliding trajectory. $Trace_{Ideal}$ ($P_0$, $P_1$, ..., $P_n$) and $Trace_{Real}$ ($P_0$, $P_1$, ..., $P_n$), it is assumed that number of points of the ideal trajectory and that of the actual sliding trajectory are respectively M, N. DTW (DynamicTimeWarping) algorithm can be used (but not limited to be used) to calculate the distance (or similarity) between each candidate word and sliding trajectory. DTW algorithm is shown in FIG. 12.

When the matching degree is calculated with respect to all the candidate word, the present invention further combine the word frequency of each word and ideal trajectory length, so as to adjust and then sort all the candidate word similarity according to the following formula, and return the user with first several most possible results.

$$match\_metric=match\_score \times ((1+(real\_path\_len/ideal\_path\_len-1) \times a) \times (1+\log(1/word\_freq) \times b) \times (1+(1-word\_len/matched\_word\_len) \times c);$$

wherein, match_score is a score obtained by calculation of the distance with respect to the actual trajectory and ideal trajectory of the word; the smaller the score is, the more those two likes alike (i.e. DTW[n, m] in above algorithm). In fact, above formula is an adjusted formula that combines word frequency of the word, word length and similarity of ideal trajectory length. a, b, c are adjusting weights of individual factors, and can be obtained by data training real_path len is length of the trajectory input by the user; ideal_path_len is length of the ideal trajectory of candidate word prefix; word_freq is word frequency of the candidate word prefix; word_len is length of the candidate word prefix (i.e. number of characters); matched word len is length of the candidate word.

In order to support prefix prediction function in this step, similarly, the trajectory segmentation algorithm as described above can be applied to find out possible segmentation points, and then accurate matching algorithm as described above can be performed, details of which are omitted for brevity.

The following is a flow which combines all the process method of the present invention, and which applies the forecasting-between-slidings input function. The present invention uses the ideal trajectory of word "quick" and a trajectory drawn by the user as examples.

Figure 13:
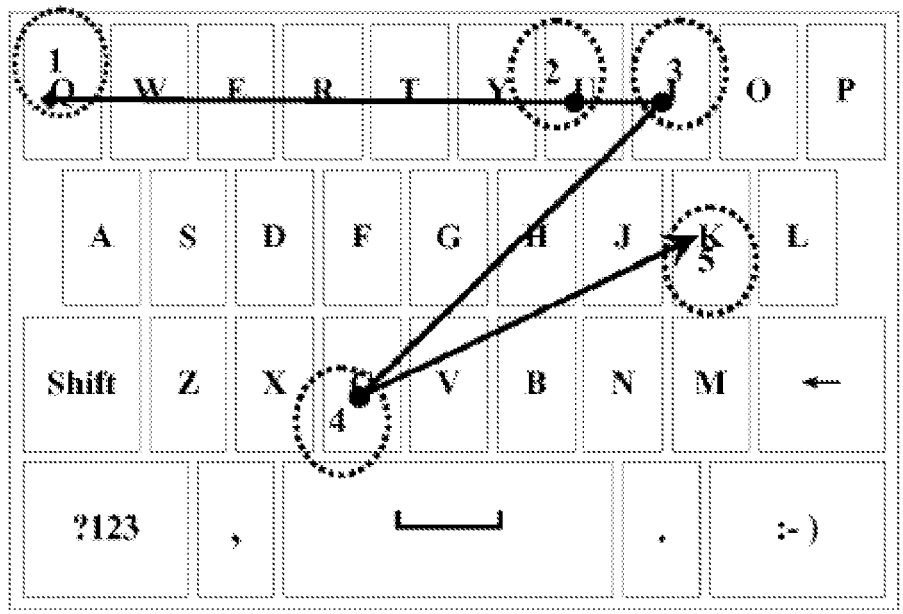
FIG. 13 is a diagram showing the tideal trajectory of word "quick" in a specific embodiment of the present invention.

Matching procedure is as follows:

(1) the ideal trajectory of word "quick" is shown in FIG. 13, wherein trajectory points corresponding to "q", "I", "c", "k" are key points, and trajectory points corresponding to "1", "3", "4", "5", "u" are deserted key point 2.

(2) when the user slides forward from a point near "q", however does not reach "u" and does not obviously stay for a time, the present invention then does not perform rough matching or accurate matching.

Figure 14:
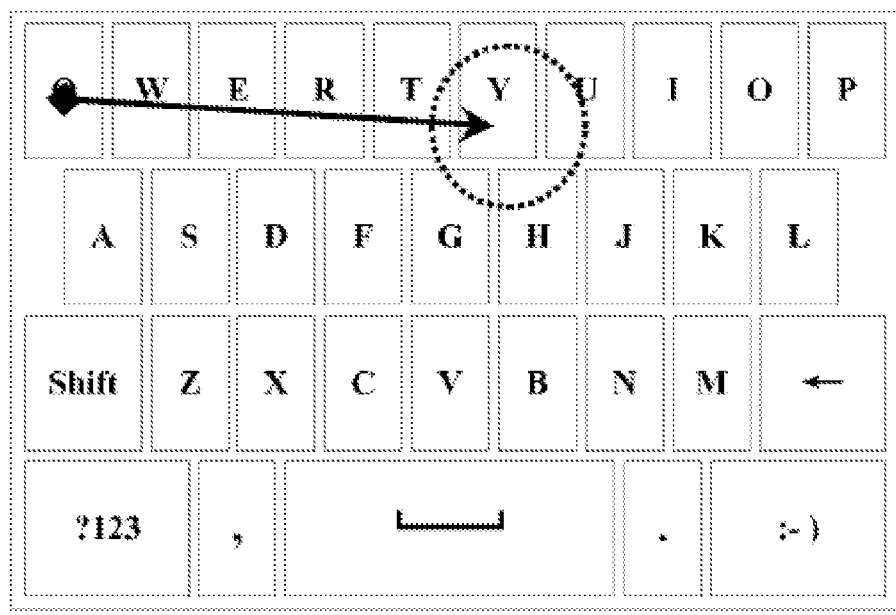
FIG. 14 is a diagram showing performing rough matching and accurate matching on the user's trajectory for the first time in a specific embodiment of the present invention.

(3) as shown in FIG. 14, when the user stay near "y" for a time, the present invention performs rough matching and accurate matching the user's trajectory for the first time.

Figure 15:
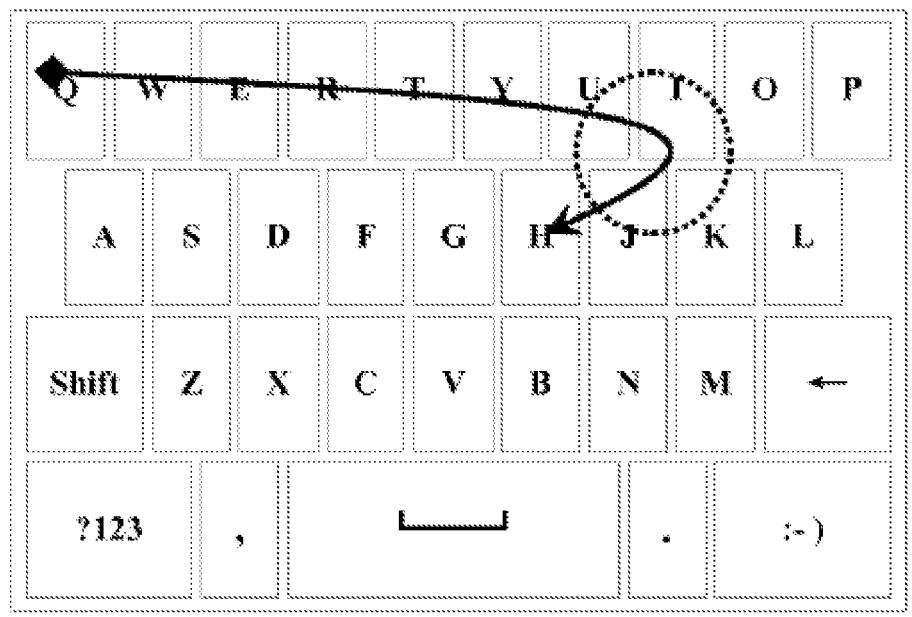
FIG. 15 is a diagram showing performing rough matching and accurate matching on the user's trajectory for the second time in a specific embodiment of the present invention.

(4) as shown in FIG. 15, when the user turns near "i" and produces a key point, the present invention performs rough matching and accurate matching the user's trajectory for the second time (at this time, matching degree of "wii" or "week" should be greater than that of "quick").

Figure 16:
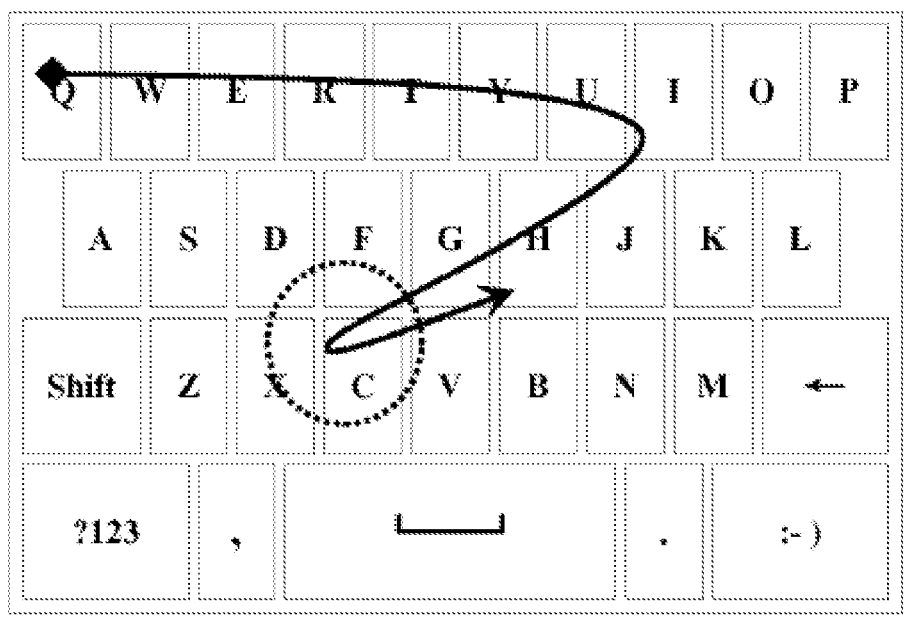
FIG. 16 is a diagram showing performing rough matching and accurate matching on the user's trajectory for the third time in a specific embodiment of the present invention.

(5) as shown in FIG. 16, when the user turns near "c" and produces a key point (the trajectory reaches "h"), performs rough matching and accurate matching the user's trajectory for the third time (at this time, matching degree of "witch" should be greater than that of "quick").

(6) as shown in FIG. 17, when the user lifts his hand near "k" and produces a key point, the present invention performs rough matching and accurate matching the user's trajectory for the fourth time (at this time, matching degree of "quick" is highest).

In the above description of the present invention, a case of how to slide a English word is illustrated. In fact, the method for implementing the sliding input of a text of the present invention can also be applied to other languges, and is not influenced by the keyboard layout. The langues supported by the method for implementing the sliding input of a text includes but is not limited to Western languages (English, French, German, and so on), Latin (Spanish, Portuguese, and so on) and Asian languages (Arabic, Dard, Chinese, Japanese, Korean, and so on). On keyboard layout, the method for implementing the sliding input of a text supports the very popular QWERTY keyboard layout, AZERTY keyboard layout commonly used in French, and any other keyboard layout.

In the following, cases of how to input French, Spanish and Chinese will be illustrated.

As for Western languages, difference between French and English is that in addition to 26 letters of English, French character further includes characters with heavy accents (accented character), such as the "à"; "á"; "a"; "é"; "ê"; "ë"; "è"; "î"; "ï"; "ô"; "ü"; "ü"; "ù"; and "ç" method for implementing the sliding input of a text supports accented character, and maps a series of accented character onto corresponding basic characters on the keyboard; for example, "à" and "â" are mapped onto "a"; "é", "ê", "ë" and "è" are mapped onto "e"; "î" and "ï" are mapped onto "i"; "ô" is mapped onto "o"; "û"; "ü" and "ù" are mapped onto "u"; and "ç" is mapped onto "c". After all the accented characters in French word are mapped onto basic characters, the French feature lexicon may be configured in a way that is similar to that of English feature lexicon, which includes the following steps:

1. extracting ideal trajectory length and word length of the word, mading a count on the word frequency of the word, and storing it into a corresponding record in said word feature table, wherein said word length is the number of characters included in the word;

2. performing Bi-grams segmentation on the word so as to obtaining a Bi-grams character string subset;

3. calculating probability of each Bi-grams character string in Bi-grams character string subset;

4. establishing a corresponding Bi-grams inverted index according to probability of each Bi-grams character string in said Bi-grams character string subset and word identification of corresponding word W within the word feature table;

5. configuring a global ideal word trajectory index table according to all the Bi-grams inverted index corresponding to said Bi-grams character string subset.

Figure 18:
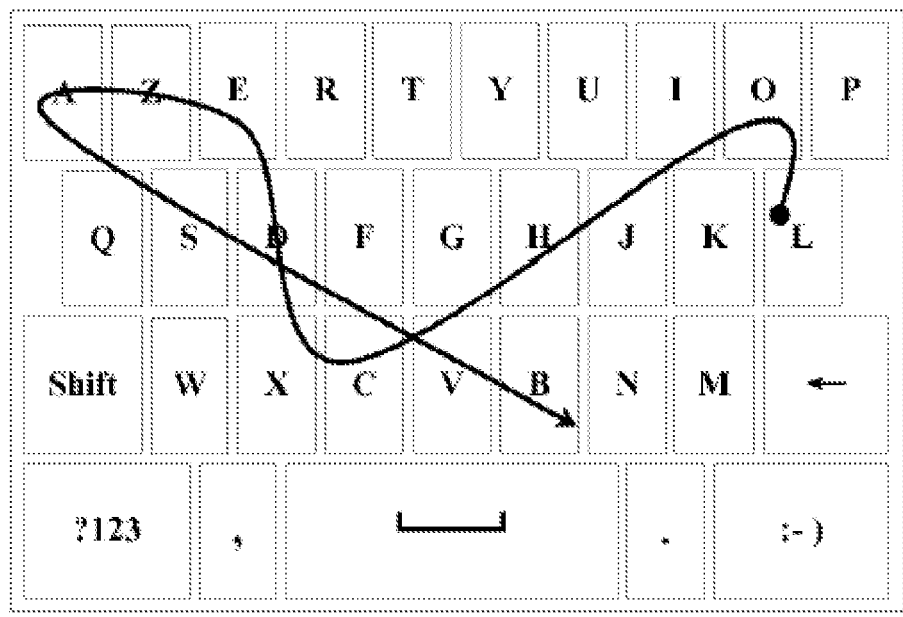
FIG. 18 is a diagram showing the user-sliding trajectory of French word L'ocean in a specific embodiment of the present invention.

The sliding input of word L'océan under AZQW keyboard layout is shown in FIG. 18, wherein sign ' can be omitted, letter "é" is mapped onto "e" of the keyboard. The user presses a finger or a handwriting pen near the letter "L", sequentially slides across "o", "c", "e", "a", and finally lift the finger or the handwriting pen near the letter "n".

Next, the method for implementing the sliding input of a text of the present invention performs trajectory preprocessing operation including size normalization, trajectory smoothing and so on on the user-sliding trajectory, and then calculate length of the user-sliding trajectory, and performs feature extraction process on the user-sliding trajectory, which includes the following steps:

1. fetching out starting and ending points of the user-sliding trajectory as starting and ending key points;
2. fetching out inflection points in the trajectory as ordinary key points by calculating change rate of slope of each point in the point sequence of the user-sliding trajectory.
3. based on the point sequence of the user-sliding trajectory, calculating distance between every two successive points;
4. adding up all the distances between two successive points, so as to obtain the length of the user-sliding trajectory.

Then, the method for implementing the sliding input of a text of the present invention obtains words having similar ideal sliding trajectory feature with the user-sliding trajectory feature set by classifying and filtering, and composing a original chosen word set; includes the following steps:

1. extracting length of the user-sliding trajectory and key point sequence on the user-sliding trajectory according to the user-sliding trajectory feature set;
2. obtaining corresponding Bi-grams character string set according to the key point sequence on said user-sliding trajectory;
3. inquiring in said feature lexicon module by making individual Bi-grams character string in the Bi-grams character string set as query conditions, and fetching out probabilities of all the inquired-out Bi-grams character strings and words corresponding to individual probability;
4. calculating a probability that the user effectively wants to obtain a word on precondition that the user inputs a sliding trajectory;
5. calculating a rough matching degree between the sliding trajectory and the word;
6. if the rough matching degree is greater than the rough matching degree threshold preseted by the system, adding corresponding word into said original chosen word set.

After obtaining the original chosen word set, the method for implementing the sliding input of a text of the present invention calculates a similarity between the ideal sliding trajectory feature of each word in the original chosen word set and said user-sliding trajectory feature set, and obtaining a follow-up chosen word set by sorting as well as matching and filtering, which includes the following steps:

1. calculating a linear matching distance between the ideal trajectory of the word in said original chosen word set and said user-sliding trajectory feature set;
2. if the linear matching distance is greater than matching degree threshold preseted by the system, adding corresponding word into said follow-up chosen word set.

After obtaining the follow-up chosen word set, in the method for implementing the sliding input of a text of the present invention, accurately calculating an accurate similarity between the ideal sliding trajectory feature of each word in the follow-up chosen word set and said user-sliding trajectory feature set includes the following steps:

1. resampling the ideal sliding trajectory of each word in said follow-up chosen word set based on a sampling distance preseted by the system, and obtaining corresponding ideal trajectorysampling point sequence;
2. resampling said user-sliding trajectory based on based on said sampling distance, and obtaining the user-trajectory sampling point sequence;
3. according to said ideal trajectorysampling point sequence and the user-trajectory sampling point sequence, calculating similar distance between the ideal sliding trajectory of each word and the user-sliding trajectory;
4. taking said similar distance as accurate similarity of the ideal sliding trajectory features of the word and the user-sliding trajectory feature set.

Then, the method for implementing the sliding input of a text of the present invention obtains the candidate result of words by sorting according to the accurate similarity, word frequency, user input history information, and outputs L'océan together with some other matched words to the user. In this way, only by simply mapping special character into keyboard letter during lexicon configuring, words can be identified according to the method step described in patent application.

Meanwhile, as for Spanish among the Latin, similar to French, it includes accented character such as "á", "é", "í", "ó" and "ú". Further, it includes character "ñ", so that there are totally 27 characters on Spanish keyboard. Similarly to French, the method for implementing the sliding input of a text supports accented character, and maps the series of accented character onto corresponding basic characters on the keyboard, and then configures a Spanishfeature lexicon in a way that is similar to the way of configuring English feature lexicon.

Figure 19:
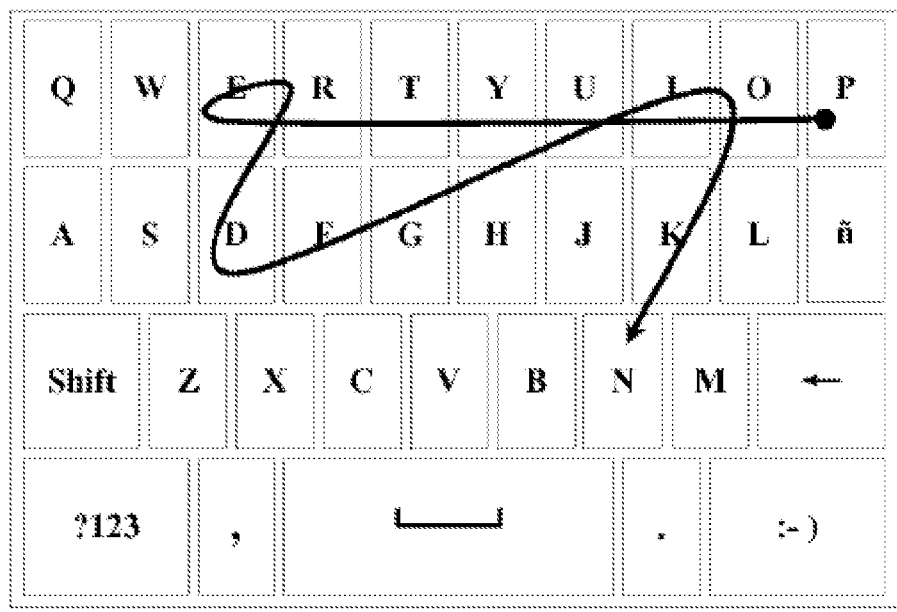
FIG. 19 is a diagram showing the user-sliding trajectory of Spanish word PcrdOrk in a specific embodiment of the present invention.

The sliding input of word Perdón under QWERTY keyboard layout is shown in FIG. 19, wherein letter "ó" is mapped onto "o" on the keyboard. The user presses a finger or a handwriting pen near the letter "P", sequentially slides across "e", "r", "d" and "o", and finally lift the finger or the handwriting pen near the letter "n". Then, after the method for implementing the sliding input of a text obtains the user-sliding trajectory, after a series of procedures similar to the process of input of French word, Perdón together with some other matched words are output to the user the user.

On the other hand, as for Chinese among Asian languages, the combination of the input letters needs to be mapped again so as to obtain character, and the user only have to input the combination of letters by sliding, then the method for implementing the sliding input of a text will automatically map the combination of letters onto corresponding Chinese characters. Every Chinese character or word group in Chinese corresponds to one combination of input letters.

In the method for implementing the sliding input of a text of the present invention: First of all, a mapping cross-reference list for Chinese characters, word groups and combinations of input letters is configured, and then the combination of input letters is configured as a Chinese feature lexicon in a way similar to the way of configuring an English feature keyboard.

Figure 20:
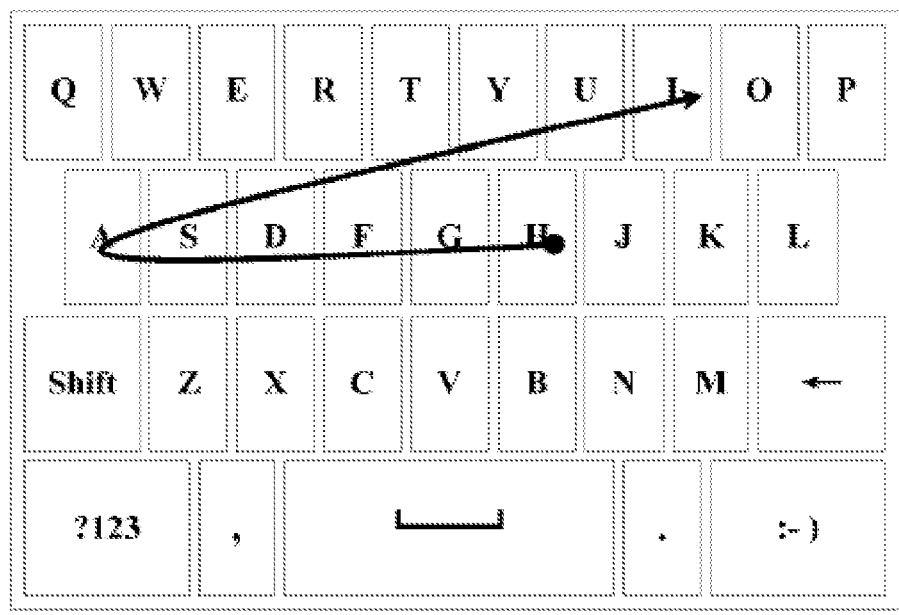
FIG. 20 is a diagram showing the user-sliding trajectory of Chinese character "好" in a specific embodiment of the present invention.

The sliding input of Chinese character 好 under QWERTY keyboard layout is shown in FIG. 20. The user only have to slide out its letter combination of "hao", and the method for implementing the sliding input of a text will automatically search out corresponding Chinese characters. The user presses a finger or a handwriting pen near the letter "H", and lifts the finger or the handwriting pen near the letter "o" after sliding over "a". Then, after the method for implementing the sliding input of a text obtains the user-sliding trajectory, after a series of procedures similar to the process of input of French word, "hao" together with some other matched combination of input letters are obtained. Then, the method for implementing the sliding input of a text further maps "hao" together with some other matched combination of input letters into 好 together with some other matched Chinese character, and outputs them to the user.

The above system and method for implementing the sliding input of a text based upon an on-screen soft keyboard on an electronic equipment are applied. Since there are six main functional modules (wherein, the user interface module is mainly responsible for interacting with the user, including recording user-sliding trajectories and showing the user the results returned by the engine; the trajectory feature extraction module is mainly responsible for converting user-sliding trajectories recorded by the UI into a feature set that can be processed, including smoothing, normalizing, feature extracting of trajectories; the feature lexicon establishment module is able to extract corresponding ideal trajectory feature from any word in a dictionary and store them in the feature lexicon; the rough classifying and filtering module is able to quickly search out a set of hundreds of possible words that resemble the trajectory out of the feature lexicon according to features of the user-sliding trajectory; the rough matching and filtering module is able to use features of key points to calculate the similarity between the set of previous search results and the sliding trajectories, rank according to the similarity, and search out several possible words; the accurate matching and sorting module is able to accurately calculate theoretical similarity between sliding trajectory and actual user-sliding trajectory with respect to each candidate word, then comprehensively consider the similarity and integrity of sliding trajectory (prefix matching requirements), and word frequency, user input history information and so on to sort candidate words, and return to the user interface module), various features in the sliding trajectory can be correctly used, the speed is guaranteed, and a function of timely providing recommended candidate words after staying on keyboard for a short moment during sliding is realized according to the preorder trajectory of the input portion (i.e. input word), in combination with associative word technology, by means of skillfully using a forecasting-between-slidings input; thus, a sliding distance is obviously decreased, the input speed and accuracy of words are effectively improved, and the operation complexity of users is obviously reduced, which realize a simple implementation process, convenient and fast utilization, stable and reliable working performance and an extensive applicable scope, prompting the large-scale application of electronic equipment touch screen information input method, and bringing the work and life of people huge convenience.

In the description, the invention is described with reference to specific embodiments. However, modifications and alternatives can be made without departing from the scope and spirit of the invention. Therefore, the description and the drawings should be considered as illustrative rather than restrictive.

The invention claimed is:

1. A system for implementing a sliding input of a text based upon an on-screen soft keyboard on an electronic equipment, characterized in that, said system comprises:
   a memory device configured to store ideal sliding trajectory features for words; and a
   processor coupled to the memory device, the processor being configured to:
      record user-sliding trajectories and convert the recorded user-sliding trajectories into a user-sliding trajectory feature set to be processed;
      filter in the memory device and originally choose the words, wherein each of the originally chosen words has similar ideal sliding trajectory features with the user-sliding trajectory feature set;
      calculate a similarity between the ideal sliding trajectory features of each originally chosen word and said user-sliding trajectory features set according to key points on said trajectory, characterized in that, calculating said similarity including the following steps: calculating a rough similarity between the ideal sliding trajectory features of each originally chosen word and said user-sliding trajectory features set; calculating an accurate similarity between the ideal sliding trajectory features of each word obtained from the rough similarity calculation result and said user-sliding trajectory features set; wherein calculating said rough similarity including performing trajectory segmentation on the ideal trajectories of the originally chosen words according to said user-sliding trajectory feature set;
      obtain candidate words according to the similarity, wherein the ideal sliding trajectory of each candidate word contains at least one of the key points or at least one of the surrounding points of at least one of the key points on said user-sliding trajectory;
      display said candidate words.

2. The system according to claim 1, characterized in that, said processor is further configured to:
   calculate a rough matching degree between words stored in said memory device according to the ideal sliding trajectory features and said user-sliding trajectory features set.

3. The system according to claim 2, characterized in that, said processor is further configured to calculate the rough matching degree by the following steps:
   obtaining a corresponding character string set according to the key point sequence on said user-sliding trajectory;
   inquiring in the memory device according to said character string set;
   fetching out probabilities of all the inquired-out strings and obtain words corresponding to individual probability;
   calculating a rough matching degree between those words and said user-sliding trajectory feature set.

4. The system according to claim 2, characterized in that, said processor is further configured to apply an incremental calculation method or a prefix matching method to calculate the rough matching degree.

5. The system according to claim 1, characterized in that, said ideal sliding trajectory features for words are stored in a way of inverted index, wherein said inverted index includes a mapping from a key point to a word node, and said word node includes a word identification and the probability that said key point appears in the ideal sliding trajectory of said word.

6. The system according to claim 5, characterized in that, said inverted index includes Bi-grams inverted index.

7. The system according to claim 1, characterized in that, said sliding trajectory features include sliding trajectory lengths of words and an word key point sequence, wherein said ideal word key point sequence is an ordered combination of key points on the sliding trajectory of the word.

8. The system according to claim 1, characterized in that, said processor is further configured to calculate a rough similarity between the ideal sliding trajectory features of each originally chosen word and said user-sliding trajectory features set by the following steps:
   calculating a linear matching distance between the ideal trajectory of each originally chosen word and said user-sliding trajectory feature set.

9. The system according to claim 1, characterized in that, said processor is further configured to calculate an accurate similarity between the ideal sliding trajectory features of each word obtained from the rough similarity calculation result and said user-sliding trajectory features set by the following steps:
   calculating an accurate linear matching distance between the ideal sliding trajectory feature of each word obtained from the rough similarity calculation result and said user-sliding trajectory feature set.

10. The system according to claim 1, characterized in that, said processor is further configured to obtain candidate words according to the similarity by the following steps:
sorting the words obtained by the accurate similarity calculation according to at least one of the accurate similarity, word frequency, user input history information and the system-configured number of candidate words.

11. A method for implementing sliding input of a text based upon an on-screen soft keyboard on an electronic equipment having a memory device and a processor, characterized in that, said method comprises the following steps:
recording user-sliding trajectories;
converting the recorded user-sliding trajectories into a user-sliding trajectory feature set to be processed;
filtering in the memory device and originally choosing the words, wherein each of the originally chosen words has similar ideal sliding trajectory features with the user-sliding trajectory feature set;
calculating a similarity between the ideal sliding trajectory features of each originally chosen word and said user-sliding trajectory features set according to key points on said trajectory, characterized in that, calculating said similarity including the following steps: calculating a rough similarity between the ideal sliding trajectory features of each originally chosen word and said user-sliding trajectory features set; calculating an accurate similarity between the ideal sliding trajectory features of each word obtained from the rough similarity calculation result and said user-sliding trajectory features set; wherein calculating said rough similarity including performing trajectory segmentation on the ideal trajectories of the original chosen words according to said user-sliding trajectory feature set;
obtaining candidate words according to the similarity, wherein the ideal sliding trajectory of each candidate word contains at least one of the key points or at least one of the surrounding points of at least one of the key points on said user-sliding trajectory;
feedbacking the candidate words.

12. The method according to claim 11, characterized in that, said sliding trajectory features include trajectory lengths of words and an word key point sequence, wherein said word key point sequence is an ordered combination of key points on the sliding trajectory of the word.

13. The method according to claim 12, characterized in that, said key points include starting and ending key points as well as ordinary key points of the trajectory, wherein said ordinary key points are inflection points on the trajectory.

14. The method according to claim 11, characterized in that, said ideal sliding trajectory features for words are stored in a way of inverted index.

15. The method according to claim 11, characterized in that, said ideal sliding trajectory features for words are stored in a way of inverted index, wherein said inverted index is a Bi-grams inverted index.

16. The method according to claim 11, characterized in that, said ideal sliding trajectory features for words are stored in a way of inverted index, wherein said inverted index includes a mapping from a key point to a word node, and said word node includes word identification and the probability that said key point appears in the ideal sliding trajectory of said word.

17. The method according to claim 11, characterized in that, said step of converting the user-sliding trajectories into a user-sliding trajectory feature set to be processed includes substeps of:
performing a trajectory preprocessing operation on the user-sliding trajectory by the system;
performing a key point extraction processing operation on the preprocessed user-sliding trajectory by the system.

18. The method for according to claim 11, characterized in that, said step of filtering in the memory device and originally choosing the words includes a substep of calculating a rough matching degree between words stored in said memory device according to the ideal sliding trajectory features and said user-sliding trajectory features set.

19. The method for according to claim 11, characterized in that, said step of filtering in the memory device and originally choosing the words utilizes an incremental calculation method or a prefix matching method.

20. The method according to claim 11, characterized in that, said step of filtering in the memory device and originally choosing the words includes following substeps:
obtaining a corresponding character string set according to the key point sequence on said user-sliding trajectory;
inquiring in the memory device according to said character string set;
fetching out probabilities of all the inquired-out strings and obtain words corresponding to individual probability;
calculating a rough matching degree between those words and said user-sliding trajectory feature set.

21. The method according to claim 11, characterized in that, said calculating a rough similarity between the ideal sliding trajectory feature of each originally chosen word and said user-sliding trajectory feature set, includes a substep of calculating a linear matching distance between the ideal trajectory of each originally chosen word and said user-sliding trajectory feature set.

22. The method according to claim 11, comprising the step of calculating an accurate similarity between the ideal sliding trajectory feature of each word obtained from the rough similarity calculation result and said user-sliding trajectory feature set in said processor, wherein said step of calculating an accurate similarity comprising the substep of calculating an accurate linear matching distance between the ideal sliding trajectory feature of each word obtained from the rough similarity calculation result and said user-sliding trajectory feature set.

23. The method according to claim 11, wherein said step of obtaining candidate words includes a substep of sorting the words obtained by the accurate similarity calculation according to at least one of the accurate similarity, word frequency, user input history information and the system-configured number of candidate words.

* * * * *